US008817885B2

(12) United States Patent
Yoon

(10) Patent No.: US 8,817,885 B2
(45) Date of Patent: Aug. 26, 2014

(54) METHOD AND APPARATUS FOR SKIPPING PICTURES

(75) Inventor: Suk-Hyun Yoon, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1852 days.

(21) Appl. No.: 11/498,196

(22) Filed: Aug. 3, 2006

(65) Prior Publication Data
US 2007/0030911 A1 Feb. 8, 2007

(30) Foreign Application Priority Data

Aug. 4, 2005 (KR) .............................. 10-2005-71497

(51) Int. Cl.
*H04N 7/12* (2006.01)

(52) U.S. Cl.
USPC ................................. 375/240.25; 375/240.01

(58) Field of Classification Search
None
See application file for complete search history.

(56) References Cited

U.S. PATENT DOCUMENTS

| 6,028,648 | A * | 2/2000 | Yu ............................. 375/240.27 |
| 6,754,274 | B2 | 6/2004 | Park |
| 6,819,394 | B1 * | 11/2004 | Nomura et al. .................. 352/38 |
| 7,010,046 | B2 * | 3/2006 | Trevers et al. ............ 375/240.29 |
| 7,016,414 | B2 | 3/2006 | Chen et al. |
| 7,630,443 | B2 | 12/2009 | Sato |
| 7,792,415 | B2 | 9/2010 | Toma et al. |
| 7,843,994 | B2 | 11/2010 | Toma et al. |
| 7,924,921 | B2 * | 4/2011 | Crinon et al. ............ 375/240.16 |
| 2002/0097797 | A1 | 7/2002 | Sugiyama |
| 2002/0118744 | A1 | 8/2002 | Park |
| 2003/0076885 | A1 * | 4/2003 | Chen et al. ............... 375/240.16 |
| 2004/0179619 | A1 * | 9/2004 | Tian et al. ................ 375/240.26 |
| 2005/0147375 | A1 | 7/2005 | Kadono |
| 2005/0259960 | A1 * | 11/2005 | Wan et al. ........................ 386/83 |
| 2006/0013318 | A1 * | 1/2006 | Webb et al. .............. 375/240.25 |

FOREIGN PATENT DOCUMENTS

| CN | 1150756 | 5/2004 |
| CN | 1572117 | 1/2005 |
| JP | 08-251543 | 9/1996 |
| JP | 2002-218472 | 8/2002 |
| JP | 2002-344974 | 11/2002 |
| JP | 2004-242286 | 8/2004 |
| JP | 2004-328634 | 11/2004 |
| JP | 2007-535187 | 11/2007 |
| JP | 2008-502171 | 1/2008 |
| KR | 1020040010960 A | 2/2004 |
| KR | 1020050026318 A | 3/2005 |
| WO | WO 2005/106875 | 11/2005 |
| WO | WO 2005107253 A1 * | 11/2005 |
| WO | WO 2005/120060 | 12/2005 |

OTHER PUBLICATIONS

Chinese Office Action dated Oct. 23, 2009, issued in corresponding Chinese Patent Application No. CN 2006101431522.
English Language Abstract of CN1158540.

* cited by examiner

*Primary Examiner* — Mehrdad Dastouri
*Assistant Examiner* — James Anderson, II
(74) *Attorney, Agent, or Firm* — Harness, Dickey & Pierce, P.L.C.

(57) ABSTRACT

In a video decoder having a picture skip function, the video decoder may obtain reference information from a network abstraction layer (NAL) unit, and upon receipt of a skip command, skips frames/pictures from where a non-reference frame/picture begins. The video decoder may execute a picture skip function, either at a fast speed or at a normal speed, according to the skip mode.

58 Claims, 22 Drawing Sheets

METHOD AND APPARATUS FOR SKIPPING PICTURES

PRIORITY STATEMENT

This application claims the priority under 35 U.S.C. §119(a) of Korean Patent Application No. 2005-0071497 filed on Aug. 4, 2005, the contents of which are herein incorporated by reference in their entirety

BACKGROUND

1. Field

Example embodiments relate to video compression, for example, video picture skipping.

2. Description of the Related Art

Video signals containing a large volume of data may often be encoded or compressed for transmission. A video player may reconstruct the video signal by decoding the encoded video signal and may display pictures corresponding to the reconstructed video signal.

FIG. 1 is a block diagram illustrating a conventional configuration of a video encoder. The video encoder may include a buffer 1, a temporal redundancy removing unit 2, a transform unit 3, a quantizing unit 4, an entropy encoding unit 5 and a bitstream generating unit 6.

The buffer 1 may temporarily store video signals received by the video encoder. The temporal redundancy removing unit 2 may remove temporal redundancy using a similarity between video frames stored in the buffer 1. The temporal redundancy removing unit 2 may generate an estimated frame with respect to a present frame in reference to one or more previous frame(s) or future frame(s), and may generate a residual frame by subtracting the estimated frame from the present frame. In other words, the temporal redundancy removing unit 2 may receive the present frames and output motion vectors and the residual frame.

The transform unit 3 and the quantizing unit 4 may remove a spatial redundancy using similarity between adjacent samples in the residual frame. The transform unit 3 may perform a transform operation with respect to the residual frame. Conventional video encoders, for example, MPEG-2, MPEG-4, H.264 and other similar video encoders may use an 8×8 or 4×4 block DCT (discrete cosine transform). DCT may also be widely used in still image compression, for example, JPEG.

Recently, methods for wavelet transform have been studied. A wavelet transform may convert the residual frame, frame by frame rather than by 8×8 blocks or 4×4 blocks. JPEG2000 for compressing still images may employ a wavelet transform. Typically, the transformed residual frame may have its energy concentrated in low frequency band. The quantizing unit 4 may quantize each of the pixels (transform coefficients) of the transformed residual frame. Most coefficients corresponding to high frequency band may become zeros as a result of quantization.

The entropy encoding unit 5 may perform lossless compression with respect to the quantized transform coefficients. Lossless compression algorithms may include variable length coding, arithmetic coding and other similar algorithms.

The bitstream generating unit 6 may generate a bitstream containing coded frames, coded motion vectors and header information.

A video decoder reconstructs frames by decoding the coded frames using a reverse process from the video encoding process. The video decoder may obtain the quantized transform coefficients by entropy decoding with respect to the coded frames in the bitstream and generate the residual frame by inverse transform and inverse quantization with respect to the quantized transform coefficients. The video decoder may reconstruct the residual frame in reference to the previously reconstructed residual frame with the motion vectors. Video frames reconstructed in the video decoder may be transformed to display signals to be displayed. For example, frames represented by YcbCr color space may be transformed to images in RGB color space and the images in RGB color space transformed into NTSC signals or PAL signals to be provided to a display device.

In general, video images are played with sound rather than images alone. The video images and the sound are necessarily synchronized to each other. When the video images are not synchronized with the sound, some frames may be skipped for synchronization of the video images and the sound during the video decoding process. In other examples, a frame rate of the compressed video data input to the video player may be different from that of images to be displayed when, for example, a user commands fast playback to the video player. The video player skips some frames, decodes remaining frames and reconstructs video images.

FIG. 2 is a block diagram illustrating a configuration of a conventional picture decoding/skipping device. The video decoder 30 operates in association with a picture elementary stream (PES) decoding circuit 10 and a bitstream buffer 20.

The PES decoding circuit 10 may include a PES decoder 11, a picture head detector 12, a picture type detector 13, a shippable picture register 14 for storing current counter value of a shippable P picture and a tag information inserter 15 for inserting a picture counter as additional header information before the next video data header following the picture header. The picture header detector 12 may include a counter to count the picture header.

The bitstream buffer 20 may output video elementary stream (ES) including some extra information upon request from the video decoder 30. A part of an external memory may be used for the bitstream buffer 20.

The video decoder 30 may be a video decoder for decoding common MPEG-2 video data supplemented with a picture decoding controller 31 capable of controlling the video decoder to skip P pictures. The picture decoding controller 31 may perform ordinary operations, for example, decoding picture headers and at the same time extracts the picture number, which is inserted additionally at the previous stage, to acknowledge the picture number as a current counter value to the PES decoding circuit 10. In such a way, the picture decoding controller 31 may control the picture skipping operation using information, for example, picture number and a picture type regarding current P picture received from the PES decoding circuit 10.

The PES decoding circuit 10 may include the picture header detector 12 to detect picture header in the video bitstream while decoding PES. The picture header detector 12 may count from zero to M−1 every picture using a counter with given bits. M may be determined by a possible number of pictures stored in the video buffer. When the counter reaches M−1, the counter counts all over again starting from zero. The counted number of the picture header is sent to the tag information inserter 15 in the PES decoding circuit 10. The PES decoding circuit 10 may also include the picture type detector 13 for detecting picture type simultaneously with detecting the picture header.

The tag information inserter 15 may insert tag information in front of (for example, immediately in front of) a video stream header, for example, picture extension header or user data header, which follows a picture header. The tag information, inserted to facilitate the operation of the video decoder 30, may contain a header and a counter value. The header may include a start code X, which may have one-byte data followed by a start code prefix having three-byte data 0, 0, 1 and defined in MPEG-2 video specification. The start code X may be established by a user and may be referred to later, for example, after being stored in a register.

This information may be used when the picture decoding controller 31 of the video decoder 30 extracts a picture header number. The header is followed by data attached to the picture header number that is as long as a length of the counter bits M.

The picture type detector 13 may store previous picture type data and extract picture type data following the current picture header. When the previous picture type is a P type and the current picture type is an I type, the picture type detector 13 may send a count value corresponding to the previous picture, that is, a count value subtracting 1 from the current picture count value to the shippable picture register 14.

The shippable picture register 14 may include N stages of registers to store valid picture numbers (numbers of shippable P pictures) from the picture type detector 13. The shippable picture register 14 may include a valid register controlling unit to designate a number of a register storing a number of a shippable P picture which may be used first among the pictures in the buffer.

The valid register controlling unit may include a device verifying the existence of more than one valid data. If any valid data exists, the valid register controlling unit may compare a currently displayed valid shippable picture number with a currently decoded picture number of a picture at every clock and send it to the video decoder 30.

When the valid shippable picture number becomes equal to the picture number of the presently decoded picture and a value of the next register, the value of the next register may be output as a valid shippable picture number.

According to such conventional methods, some P pictures as well as B pictures may be skipped. The conventional methods may not satisfy presentation time stamp (PTS) requirements or overcome a difference of frame rates, but may prevent image distortion or overflow of a video buffer.

A shippable buffer should be a picture, (hereinafter referred to as "non-reference picture") which is not referred by any other pictures, or not be a picture, (hereinafter referred to as "reference picture") which is referred to by any other pictures. That is, when a reference picture is skipped, a picture referring to the skipped reference picture may not be decoded.

Recent video coding methods have been designed to determine whether to skip or not using a picture type or a picture number as the conventional technique does because a B picture may be used as a reference picture. For example, it is difficult for a video decoder receiving a bitstream encoded by a video coding method such as H.264, in which a B picture may be used as a reference picture, to determine whether to skip or not simply by using a picture type or a picture number. However, such video decoder also requires a picture skip function.

SUMMARY

Example embodiments provide a video decoding method and a video decoder using the method that is capable of skipping pictures.

Example embodiments provide a video playback method and a video player using the method capable of skipping pictures.

Example embodiments provide a picture skip function for a bitstream encoded by a video coding method wherein skipping probability of a picture is not determined by, or only by, a type (I, P, or B) of the picture.

In an example embodiment, a decoding part for decoding encoded frames within a bitstream to reconstruct original frames; a header processing part for obtaining reference information from header information within the bitstream, the reference information indicating whether each of the encoded frames corresponds to a non-reference frame or reference frame; and a skip determiner for instructing the decoding part to skip non-reference frames from a non-reference frame that follows immediately after a currently decoded frame when the skip determiner receives a skip command.

In an example embodiment, a video player includes a decoding part for decoding encoded frames within a bitstream to reconstruct original frames; a header processing part for obtaining reference information from header information within the bitstream, the reference information indicating whether each of the encoded frames corresponds to a non-reference frame or reference frame; a skip determiner for instructing the decoding part to skip non-reference frames from a non-reference frame that follows immediately after a currently decoded frame when the skip determiner receives a skip command; a signal transforming part for transforming the reconstructed original frames into display signals; and a displaying part for video images according to the display signals.

In an example embodiment, a video decoder includes a decoding part for decoding encoded pictures within a bitstream to reconstruct original frames; a header processing part for obtaining reference information from header information in the bitstream, the reference information indicating whether each of the encoded pictures corresponds to a non-reference picture or a reference picture; a virtually decoded picture buffer descriptor for storing a field indicating information to indicate whether the encoded picture corresponds to a first field or not; and a skip determiner for instructing the decoding part to skip non-reference pictures from either of a first field or a non-reference picture that follows immediately after a currently decoded picture when the skip determiner receives a skip command.

In an example embodiment, a video player includes a decoding part for decoding encoded pictures within a bitstream to reconstruct original pictures, wherein the encoded picture is either a field or a picture; a header processing part for obtaining reference information from header information within the bitstream, the reference information indicating whether each of the encoded pictures corresponds to a non-reference picture or a reference picture; a virtually decoded picture buffer descriptor for storing a field indicating information to indicate whether the encoded picture corresponds to a first field or not; a skip determiner for instructing the decoding part to skip non-reference pictures from either a first field or a non-reference picture that follows immediately after a currently decoded picture when the skip determiner receives a skip command; a signal transforming part for transforming the reconstructed original pictures to display signal; and a display for outputting video images according to the display signal.

In an example embodiment, a video decoder includes a decoding part for decoding encoded pictures within a bitstream to reconstruct original pictures, wherein the encoded picture is either a field or a frame; a header processing part for obtaining reference information from header information within the bitstream, the reference information indicating whether each of the encoded pictures corresponds to a non-reference picture or a reference picture; a virtually decoded picture buffer descriptor for storing a field indicating information to indicate whether the encoded picture corresponds to a first field or not; a skip mode selector for selecting a picture skip mode between a normal picture skip mode for skipping non-reference pictures and a fast picture skip mode for skipping pictures sequentially; and a skip determiner, under the normal picture skip mode, instructing the decoding part to skip non-reference pictures from a non-reference picture that is either a first field or a frame and follows immediately after a currently decoded picture, and under the fast picture skip mode, instructing the decoding part to skip pictures from a picture next to the currently decoded picture.

In an example embodiment, a video player includes a decoding part for decoding encoded pictures within a bitstream to reconstruct original pictures, wherein the picture is either a field or a frame; a header processing part for obtaining reference information from header information within the bitstream, the reference information indicating whether each of the encoded pictures corresponds to a non-reference picture or a reference picture; a virtually decoded picture buffer descriptor for storing a field indicating information to indicate whether the encoded picture corresponds to a first field or not; a skip mode selector for selecting a picture skip mode between a normal picture skip mode for skipping non-reference pictures and a fast picture skip mode for skipping pictures successively; a skip determiner, under the normal picture skip mode, instructing the decoding part to skip non-reference pictures from a non-reference picture that is either a first field or a frame and follows immediately after a currently decoded picture, and under the fast picture skip mode, instructing the decoding part to skip pictures from a picture next to the currently decoded picture; a signal transforming part for transforming the reconstructed original pictures to display signal; and a display for outputting video images according to the display signal.

In an example embodiment, a method of video decoding encoded frames in a bitstream to reconstruct original frames includes: obtaining reference information from header information within the bitstream, the reference information indicating whether each of the encoded frames corresponds to a non-reference frame or a reference frame; receiving a skip command; and skipping non-reference frames from a non-reference frame that follows immediately after a currently decoded frame.

In another example embodiment, a method of video playback includes decoding encoded frames in a bitstream to reconstruct original frames, transforming the reconstructed original frames to a display signal and outputting video images corresponding to the display signal includes obtaining reference information from header information within the bitstream, the reference information indicating whether each of the encoded frames corresponds to a non-reference frame or a reference frame; receiving a skip command; and skipping non-reference frames from a non-reference frame that follows immediately after a currently decoded frame.

In an example embodiment, a method of video decoding for reconstructing pictures by decoding encoded pictures in a bitstream to reconstruct original pictures, wherein the picture includes a field or a frame, includes obtaining reference information from header information within the bitstream, the reference information indicating whether each of the encoded pictures corresponds to a non-reference picture or a reference picture; storing a field indicating information to indicate whether the encoded picture corresponds to a first field or not; receiving a skip command; and when a skip command is received, skipping non-reference pictures from a non-reference picture that is either a first field or a first non-reference picture, that follows immediately after a currently decoded picture.

In an example embodiment, a method of video playback includes decoding pictures in a bitstream to reconstruct original pictures, transforming the reconstructed original pictures to a display signal and outputting video images corresponding to the display signal wherein the encoded picture is either a field or a frame wherein the method further includes obtaining reference information from header information within the bitstream, the reference information indicating whether each of the encoded pictures corresponds to a non-reference picture or a reference picture; storing a field indicating information to indicate whether the encoded picture corresponds to a first field or not; receiving a skip command; and when a skip command is received, skipping non-reference pictures from a non-reference picture that is either a first field or a first non-reference picture, that follows immediately after a currently decoded picture.

In an example embodiment, a method of video decoding by decoding encoded pictures in a bitstream, wherein the encoded picture is either a field or a frame, includes obtaining reference information from header information within the bitstream, the reference information indicating whether each of the encoded frames corresponds to a non-reference frame or a reference frame; storing a field indicating information to indicate whether the encoded picture corresponds to a first field or not; selecting a picture skip mode between a normal picture skip mode for skipping non-reference pictures and a fast picture skip mode for skipping pictures successively; when the normal picture skip mode is selected, skipping non-reference pictures from a non-reference picture that is either a first field or a frame and follows immediately after a currently decoded picture; and when the fast picture skip mode is selected, skipping pictures from a picture next to the currently decoded picture.

In an example embodiment, a method of video playback video playback that decodes pictures in a bitstream to reconstruct original pictures, transforms the reconstructed original pictures to a display signal and outputs video images corresponding to the display signal, wherein the method includes obtaining reference information from header information within the bitstream, the reference information indicating whether each of the encoded frames corresponds to a non-reference frame or a reference frame; storing a field indicating information to indicate whether the encoded picture corresponds to a first field or not; selecting a picture skip mode between a normal picture skip mode for skipping non-reference pictures and a fast picture skip mode for skipping pictures successively; when the normal picture skip mode is selected, skipping non-reference pictures from a non-reference picture that is either a first field or a frame and follows immediately after a currently decoded picture; and when the fast picture skip mode is selected, skipping pictures from a picture next to the currently decoded picture.

BRIEF DESCRIPTION OF THE DRAWINGS

Example embodiments will become more apparent by describing them in more detail with reference to the accompanying drawings, in which.

DESCRIPTION OF EXAMPLE EMBODIMENTS

Figure 1:
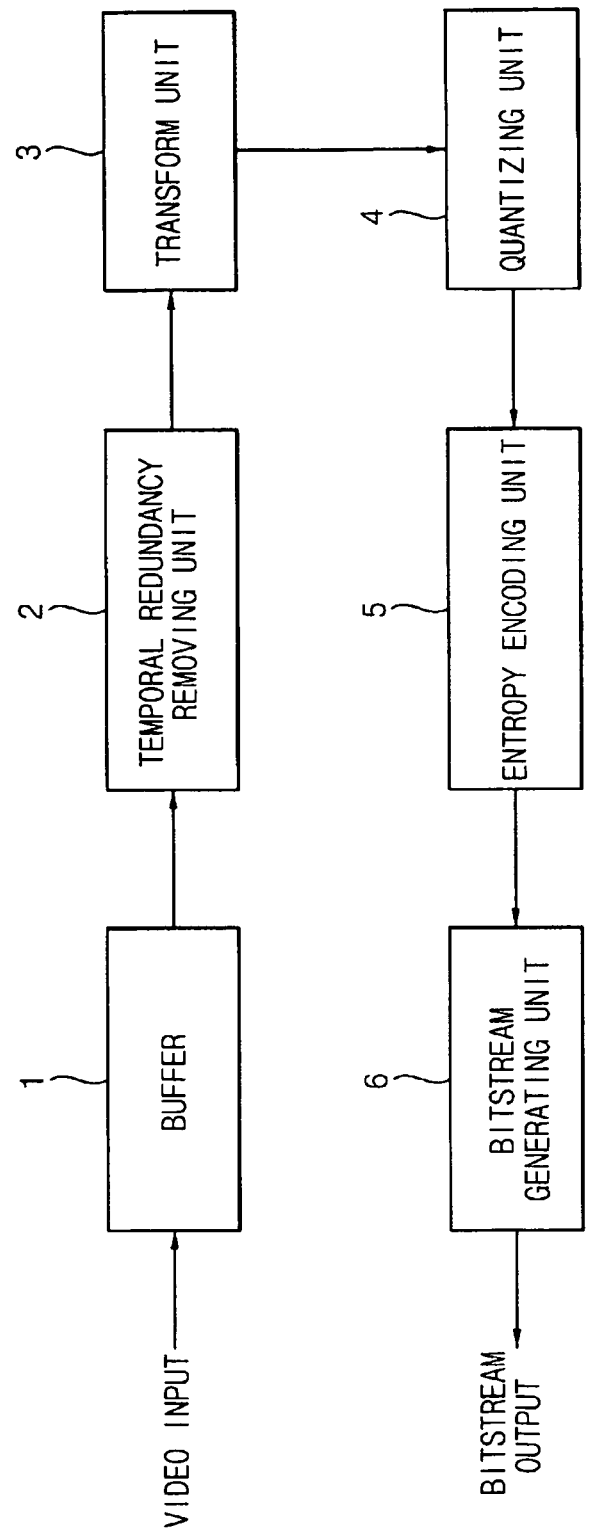
FIG. 1 is a block diagram illustrating a conventional configuration of a video encoder.
Figure 2:
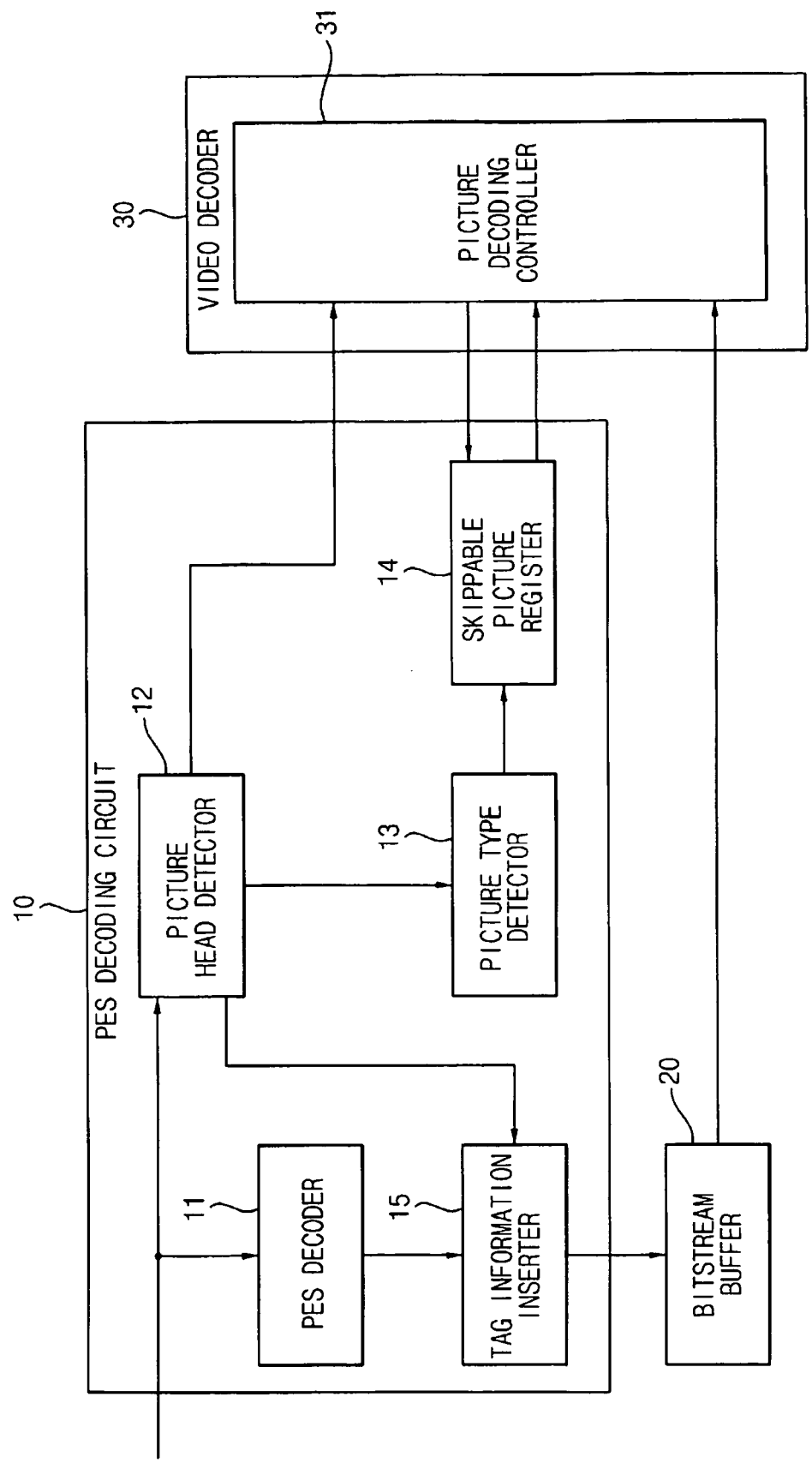
FIG. 2 is a block diagram illustrating a conventional picture decoding/skipping device.

Example embodiments are described more fully hereinafter with reference to the accompanying drawings. Example embodiments are provided so that this disclosure will be thorough and complete, and will fully convey the scope of the appended claims to those skilled in the art.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element or component, from another element or component. Thus, a first element or component discussed below could be termed a second element or component without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternate implementations, the functions/acts noted in the blocks may occur in an order other than those set forth in the flowcharts. For example, two blocks shown in succession may in fact be executed substantially concurrently or the blocks may sometimes be executed in the reverse order, depending upon the functionality/acts involved.

Below are example definitions of frame, field and picture for clearer description.

A frame may denote an image built by an array of luminance components and two arrays of chrominance components corresponding to the luminance components. A field may denote a set of upper one or lower one of every two rows in the frame. A field may be classified as a top field or a bottom field. That is, one frame may contains two fields. A picture may denote a field as well as a frame. An entity may denote a frame or a picture.

Figure 3:
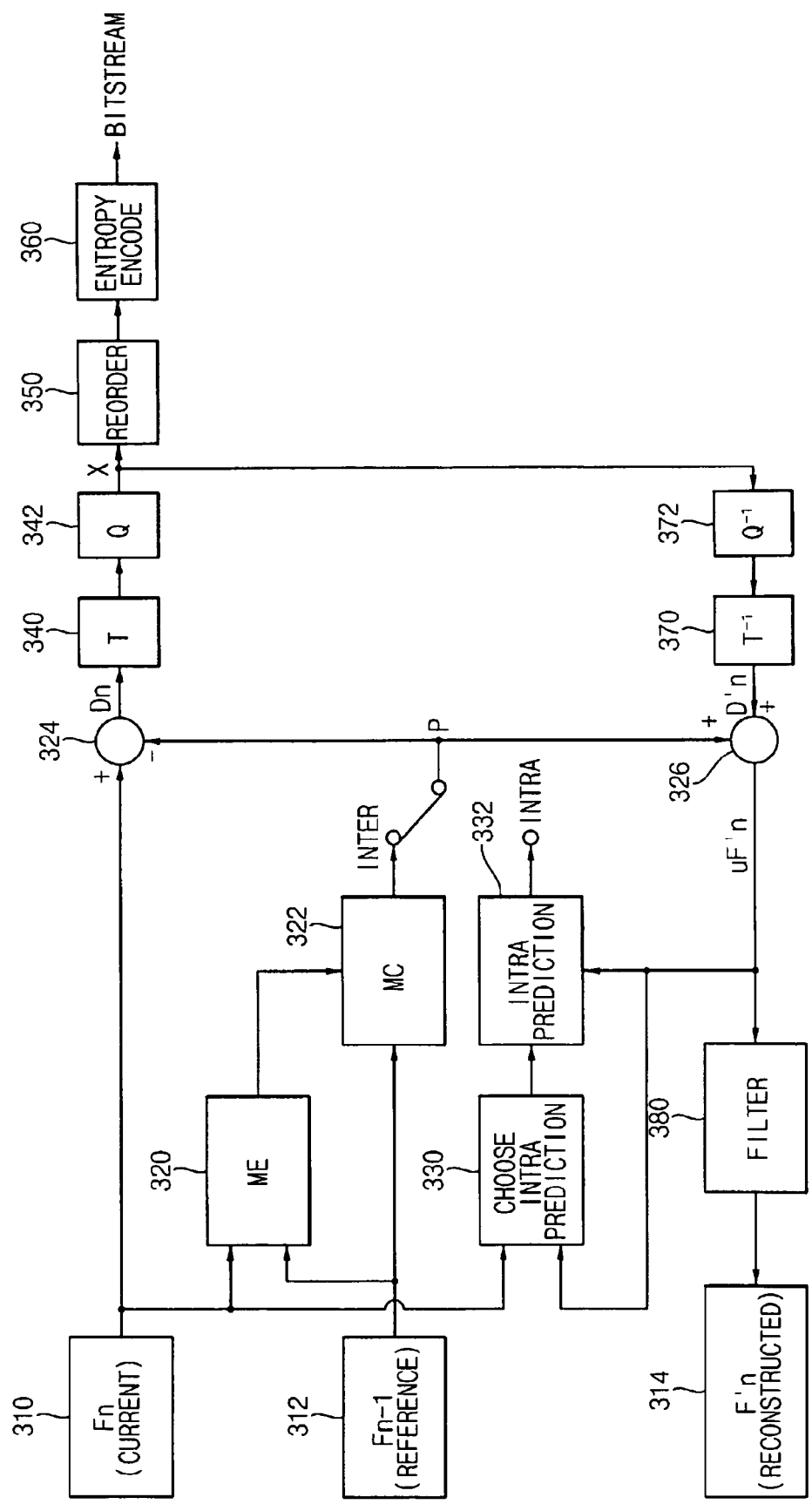
FIG. 3 is a block diagram illustrating a video encoder for H.264.

FIG. 3 is a block diagram illustrating a video encoder for H.264.

An H.264 video encoder removes temporal redundancy in video frames using a motion estimator 320, a motion compensator 322, an intra prediction selector 330, an intra predictor 332 and a comparator 324. The temporal redundancy may be removed block by block. An H.264 video encoder may further include transform unit 340 and quantizer 342 for removing spatial redundancy in a residual frame resulting from removal of the temporal redundancy in the video frames.

The motion estimator 320 may obtain motion vectors from a current frame 310 and a reference frame 312. The motion compensator 322 may obtain a prediction frame corresponding to the current frame 310 using the reference frame 312 and the motion vectors. The H.264 video encoder may also provide an intra prediction mode, where the intra prediction selector 330 decides whether to encode blocks in the current frame 310 by intra prediction or to encode the blocks by inter prediction via motion compensation. The intra predictor 332 executes the intra prediction.

The comparator 324 may obtain the residual frame Dn from comparison the current frame with the prediction frame that is constructed by either the inter prediction and the intra prediction.

The transform unit 340 may execute a DCT transform by 4×4 blocks with respect to the residual frame. The quantizer 342 may quantize transform coefficients from the DCT transform according to a given quantization parameter.

A scanning circuit 350 may execute a zigzag scan or a field scan with respect to the quantized transform coefficients. An entropy encoder 360 may perform compression with no loss of the scanned coefficients.

The coded frames from which temporal redundancy, spatial redundancy and statistic repetition are removed may be transformed into a bitstream in this manner.

An H.264 video encoder may further use a closed-loop algorithm for the video encoding as well as MPEG-2. In this example, the reference frame 312, which is used for the motion estimation, is not an original frame, but a reconstructed frame from decoding the encoded frame. To meet what is described above, the H.264 video encoder may include an inverse quantizer 372 for inverse quantizing the quantized transform coefficients, and an inverse transform unit 370 for inverse DCT transforming the inverse quantized transform coefficients. A residual frame D'n reconstructed by the inverse transform may be added to the prediction frame, which is obtained from the reference frame 312 and the motion vectors, to generate a frame uF'. The frame uF' may be reconstructed after being processed by the filter 380, which eliminates blocking. The reconstructed frame 314 may be used as a reference frame while encoding other frames.

Figure 4:
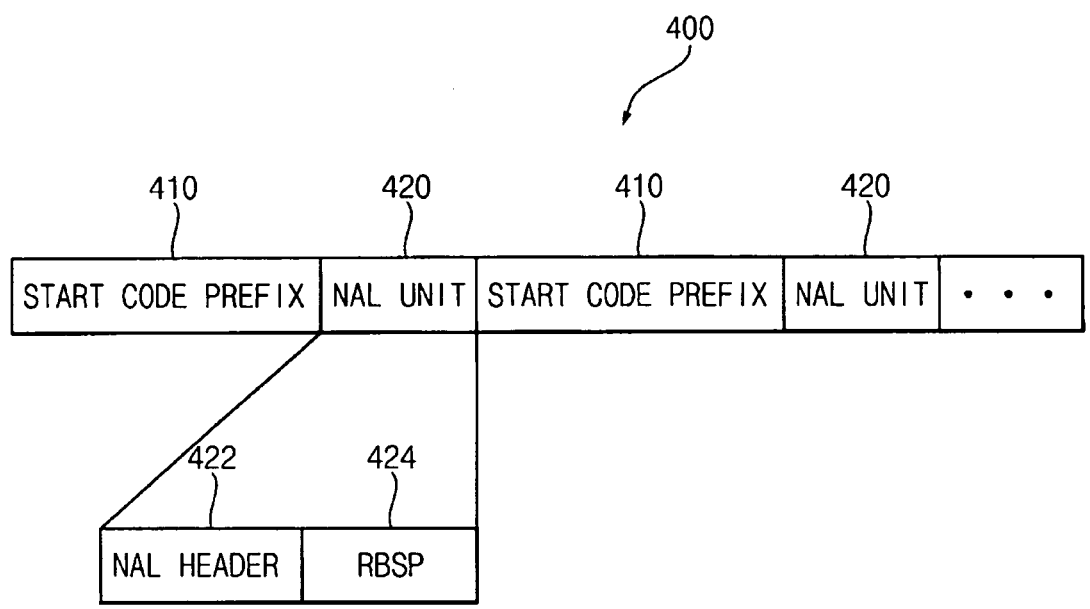
FIG. 4 is a data diagram illustrating structure of a bitstream for H.264.

FIG. 4 is a data diagram illustrating a bitstream structure for H.264.

In H.264, a bitstream may refer to a series of bits forming combined data for a display of coded pictures and/or one or more video sequence(s). A bitstream may be a network abstraction layer (NAL) unit stream, a byte stream and/or something else.

A bitstream 400 may include a series of NAL unit syntax structures that are also byte streams. The NAL unit syntax structure may be formed with a start code prefix 410 and/or an NAL unit 420.

The start code prefix 410 may be 3 bytes long, 0x000001.

The NAL unit 420 may be formed with an NAL header 422 for indicating a data type and a raw byte sequence payload (RBSP) 424.

The NAL header 422 may contain information indicating whether an encoded picture within the NAL unit 420 is a reference picture or not. To meet what is described above, the NAL header 422 may include a field designated as "nal_ref_idc". When the nal_ref_idc field is 0, the encoded picture is a non-reference picture. When the nal_ref_idc field is not 0, the encoded picture is a reference picture.

The RBSP 424 may contain a slice header and slice data. The slice header may include information regarding slice type, frame number, and the like. In H.264 standards, frame number is used as a unique identifier for the reference frame. For example, when there are five frames and the third frame is a non-reference frame, the frame numbers may be designated as reference frame 1, reference frame 2, reference frame 3, non-reference frame 3, and reference frame 4, respectively. For example, every reference frame may be assigned with a different frame number. A slice may include an integer number of macro-blocks.

Receiving a bitstream in accordance with H.264 standards, the video decoder may not use picture type for the picture skip function. But, the video decoder may execute the picture skip function using reference information in the NAL header 422 that indicates whether the picture is referred to or not. There may be problems raised when the picture skip function is executed by using only the reference information in the NAL header 422 that will be described below.

Figure 5:
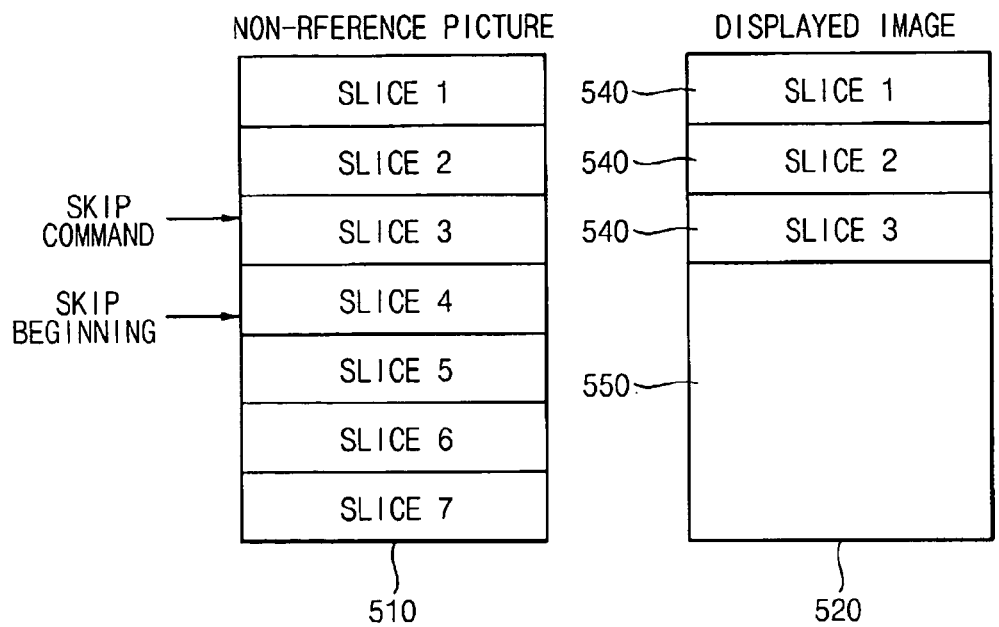
FIG. 5 is a diagram illustrating a phenomenon in which decoding occurs using non-reference information for H.264.

FIG. 5 is a diagram illustrating a phenomenon in which decoding occurs using non-reference information for H.264.

When receiving a skip command, a video decoder may determine whether a slice, which is currently being decoded, is included in a non-reference picture or not. For example, if a skip command is received during decoding the third slice in a non-reference picture 510, the fourth and subsequent slices are all skipped. In this example, an image is displayed on a screen as divided into a normally decoded part 540 and a skipped part 550. The skipped part has no signal and a viewer may consider the image to be corrupt.

As described above, video decoding methods such as H.264 transmit a bitstream in units smaller than pictures, e.g., in slices and it is not easy for such methods to be implemented with a picture skip function using the picture reference information only.

Video decoders and decoding methods with a picture skip function, according to example embodiments, will be described hereinafter. For convenience of description, the video decoders will be described on basis of a bitstream encoded in accordance with H.264. However, such are illustrative of example embodiments and may also be applied to other decoding methods.

Figure 6:
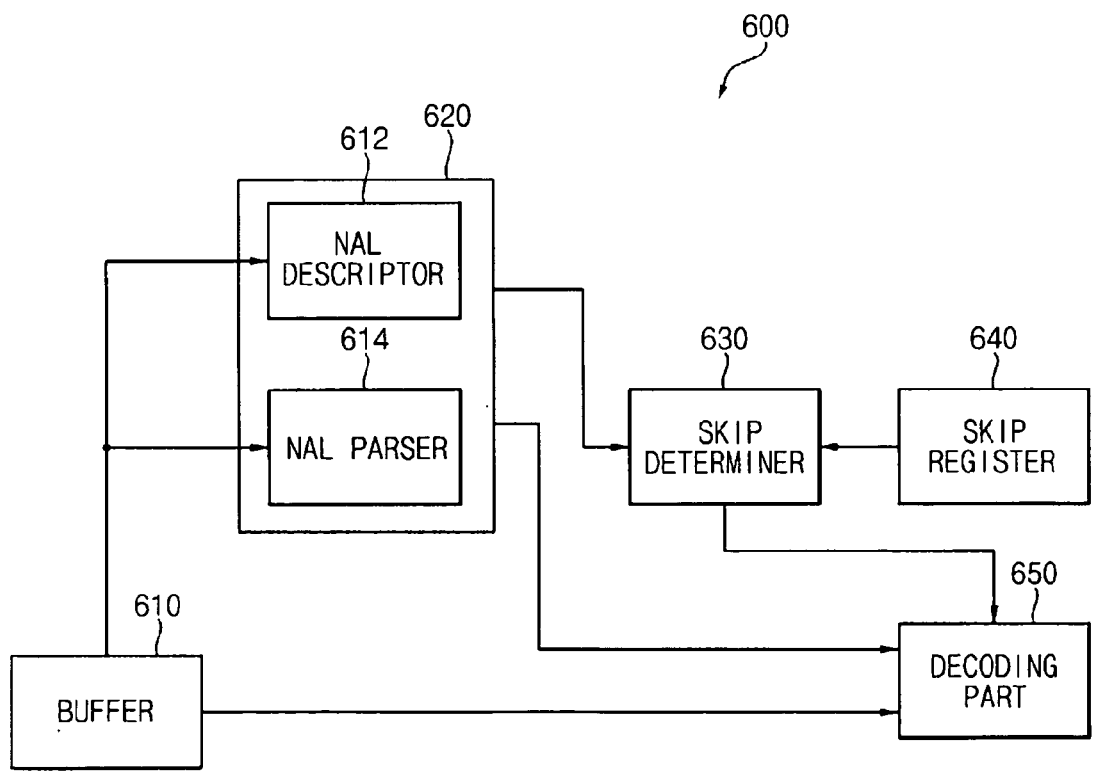
FIG. 6 is a block diagram illustrating a configuration of a video decoder according to an example embodiment.

FIG. 6 is a block diagram illustrating a configuration of a video decoder according to an example embodiment.

A video decoder 600 may include a buffer 610, a header processing part 620, a skip determiner 630 and/or a decoding part 650.

The buffer 610 may store a bitstream flowing into the video decoder 600. Header information of the bitstream may be provided to the header processing part 620 and a coded frame of the bitstream may be provided to the decoding part 650.

The header processing part 620 may obtain reference information from the header information in the bitstream that indicates each frame is a non-reference frame or a reference frame. To obtain the reference information, the header processing part 620 may include an NAL descriptor 612 and an NAL parser 614. The NAL descriptor 612 may interpret an NAL header in each NAL unit of the bitstream. The header processing part 620 may be capable of determining whether a slice included in the current NAL unit is a reference slice or a non-reference slice by reading a reference information field nal_ref_idc from the NAL header. The NAL parser 614 may interpret slice header information in an RBSP of the NAL unit. The slice header information may contain information on slice type (slice_type), frame number (frame_num) and the like.

In response to a skip command, the skip determiner 630 instructs the decoding part 650 to skip a non-reference frame. The header processing part 620 may provide the header information that indicates each frame is a non-reference frame or a reference frame, and the skip determiner 630 may guide the decoding part 650 to skip frames from the beginning of the non-reference frame. Because the H.264 video decoder 600 executes the video decoding in slices, the skip determiner 630 may guide the decoding part 650 to skip frame by frame when the non-reference slice is a beginning slice of a frame.

A skip register 640 may store state information regarding whether the video decoder executes or stops skip operations. The state information may be provided to the skip determiner 630.

The decoding part 650 may decode the encoded frames from the bitstream to reconstruct frames. The bitstream in accordance with H.264 standards is composed of the NAL units including slices. Therefore, with respect to the bitstream in accordance with H.264 standards, the decoding part 650 may reconstruct the frames by decoding the bitstream in slices.

The decoding part 650 may execute a skip function by frames based on instruction to skip from the skip determiner 630.

Figure 7A:
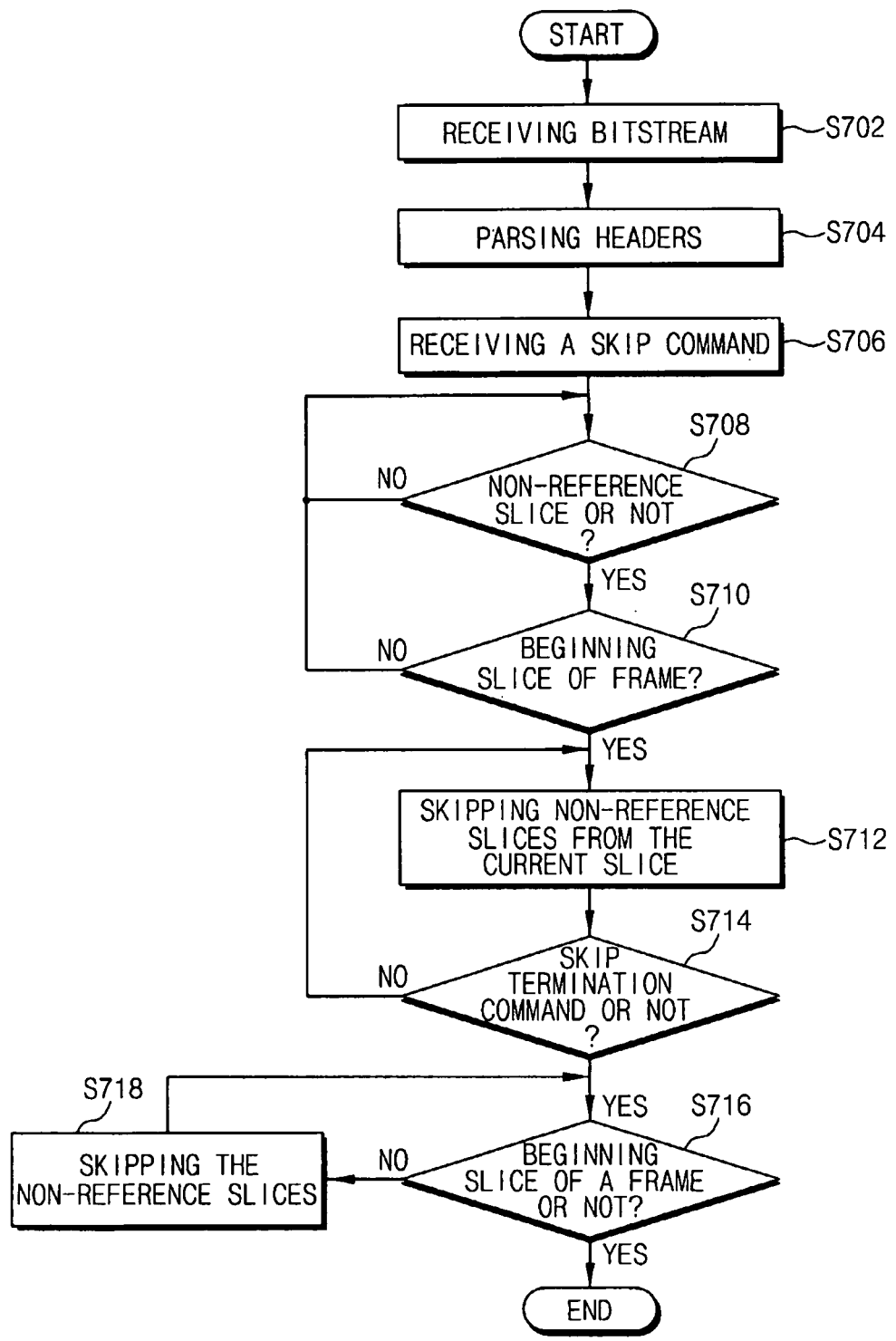
FIG. 7A is a flow chart illustrating a skip process according to an example embodiment.

FIG. 7A is a flow chart illustrating a skip function according to example embodiment.

The video decoder may receive a bitstream (block S702). The bitstream in accordance with H.264 standards is composed of the NAL units including slices of the encoded frames.

The video decoder may parse a header from the received bitstream (block S704). For the bitstream in accordance with H.264 standards, the video decoder may obtain information indicating whether the current slice is a reference slice or a non-reference slice. The video decoder may also obtain information regarding slice type, frame number and other information regarding the frame, to which the current slice belongs, from a slice header included in the NAL unit. After header is parsed, the video decoder may decode the encoded frames.

When a skip command is input (block S706), a frame skip function may begin.

The video decoder may determine, based on the information from the header parsing operation, whether the current slice is a non-reference slice or not (block S708). When the current slice is a reference slice, the video decoder may continue the video decoding operation.

When the current slice is a non-reference slice, the video decoder may determine whether the current slice is a beginning slice of the frame (block S710) or not. The video decoder may determine that the current slice is a beginning slice, if no non-reference slice before the current slice has the same frame number as the current slice. If the current slice is a beginning slice, the video decoder may repeat determining whether the next slice is a non-reference slice or not, and a beginning slice of a frame or not.

When the current slice is determined as a beginning slice of a frame, the video decoder may start to skip non-reference slices from the current slice (block S712). The video decoder may determine whether the following slices are reference slices or non-reference slices, so as to skip the slices when the slices are determined as non-reference slices. Because the non-reference slices do not co-exist with the reference slices the video decoder may decide whether a picture is referred to or not based on whether the slice is referred to or not from the NAL header.

During execution of the skip function with respect to the non-reference slices, the video decoder may check whether a skip termination command is input or not (block S714). If the skip termination command is not input, the video decoder continues to skip the non-reference slices. When the skip termination command is input, the video decoder may determine whether the current slice is a beginning slice of a frame or not (block S716). When the current slice is not a beginning slice of a frame, the video decoder may continue to skip the non-reference slices (block S718). If the current slice is a beginning slice of a frame, the video decoder may terminate the skip operation, regardless of whether the current slice is a non-reference slice or a reference slice.

Figure 7B:
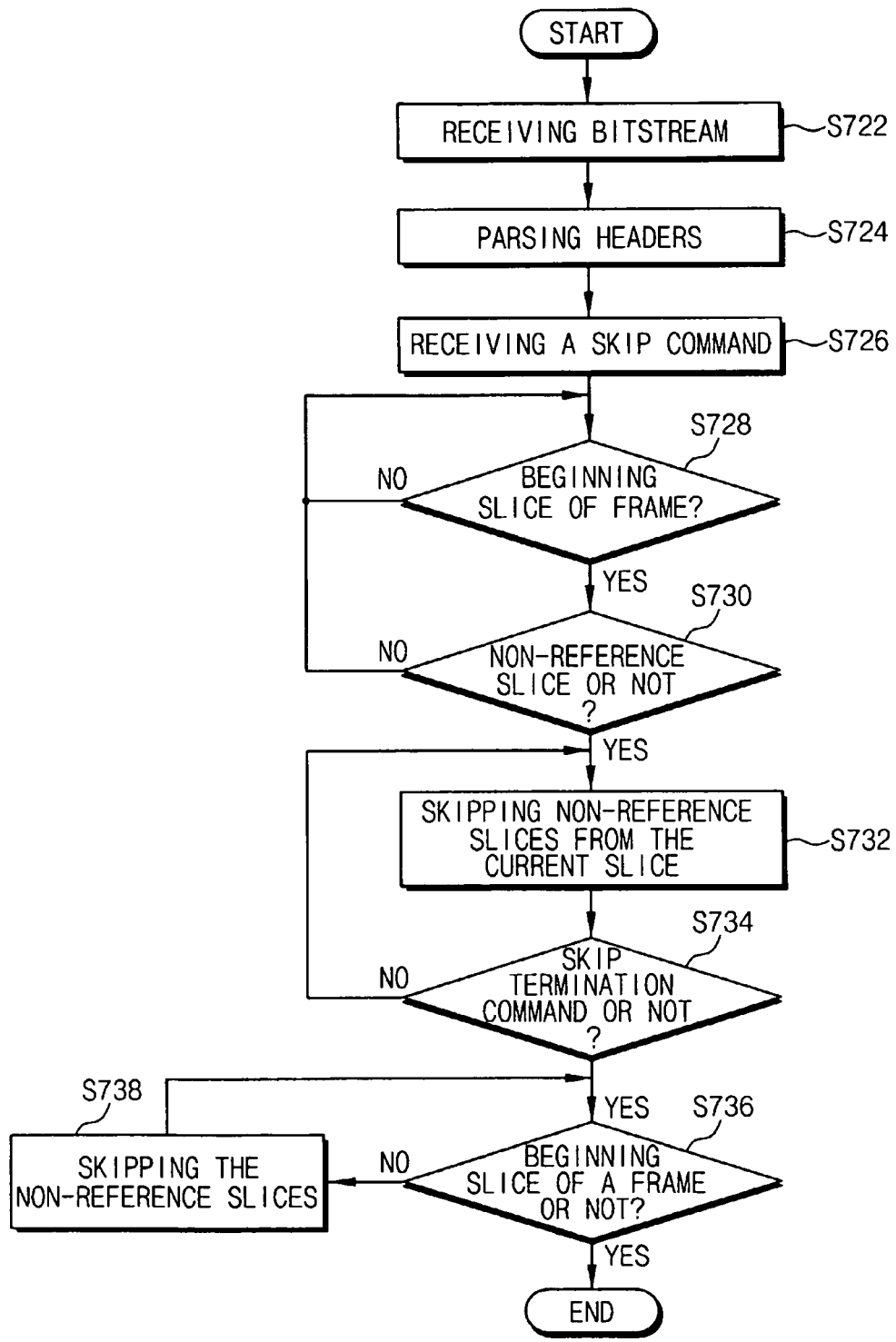
FIG. 7B is a flow chart illustrating another skip process according to another example embodiment.

FIG. 7B is a flow chart illustrating another skip function according to another example embodiment.

A block S722 for receiving a bitstream, a block S724 for parsing a header and a block S726 for receiving a skip command are substantially identical to those of blocks S702, S704, and S706, respectively, in FIG. 7A. In the skip function in FIG. 7B, it is determined whether the current slice is a beginning slice of a frame or not (block S728) before determining whether the current slice is a non-reference slice or not (block S730). These skip operations are illustrative of the example embodiments, and the order or detailed processes may be changed or rearranged.

When the current slice corresponds to a beginning slice as well as to a non-reference slice at the same time, the video decoder repeatedly skips the non-reference slices (S732). Blocks S734 through S738 are substantially identical to the corresponding blocks in FIG. 7A.

Referring to FIG. 7A or to FIG. 7B, the video decoder, which decodes frames encoded in slices, may determine whether the current slice is a beginning slice or not and may determine whether the current slice is a non-reference slice or not. The video decoder may perform the skip operation by frames from a slice that corresponds to a non-reference slice and a beginning slice at the same time. Therefore, according to example embodiment of the present invention in FIG. 7A or FIG. 7B, images displayed on a screen are not as corrupted as shown in FIG. 5.

Figure 8:
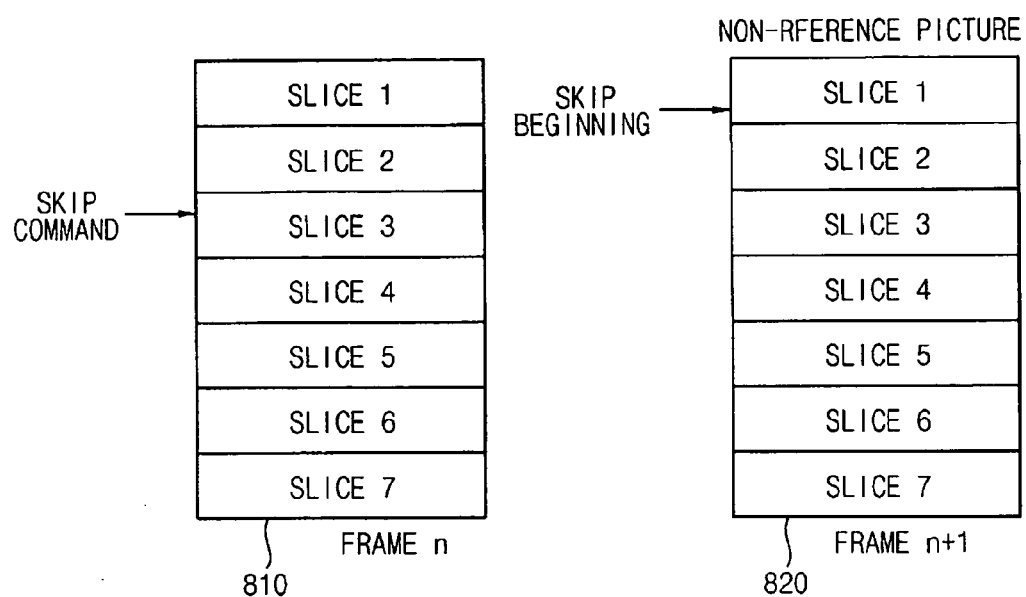
FIGS. 8 and 9 are diagrams illustrating a skip function according to an example embodiment.
Figure 9:
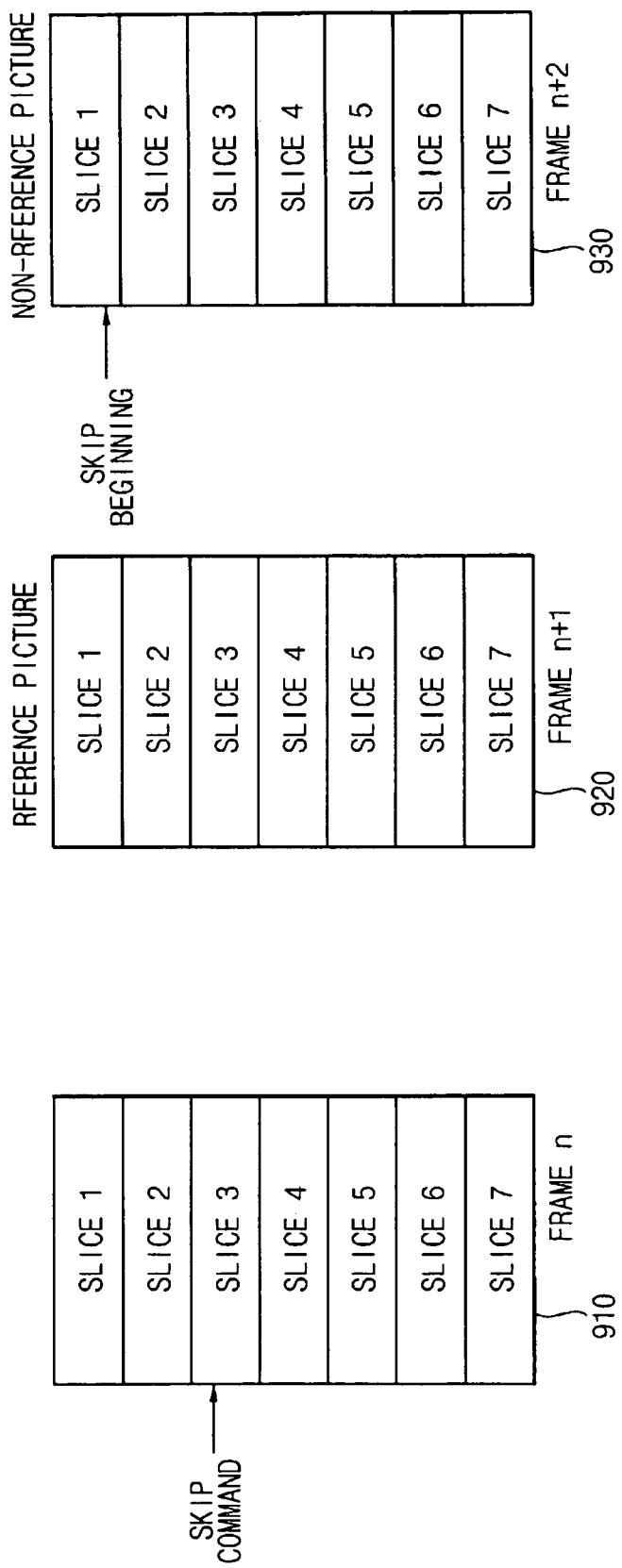

FIGS. 8 and 9 are diagrams illustrating a skip function according to example embodiments in FIG. 7A or FIG. 7B.

Referring to FIG. 8, a video decoder may decode an n-th frame 810 from slice 1. The video decoder may receive a skip command while decoding slice 3 within the n-th frame 810. In response to the skip command, the video decoder may complete the decoding of slice 3, and determine whether slice 4 (the current slice) is a beginning slice, and whether slice 4 is a non-reference slice. Because slice 4 is not determined as a beginning slice, the video decoder may decode slice 4 and prepares the skip operation with respect to slice 5 (the next slice). The video decoder may determine whether slice 5 is a beginning slice, and whether slice 5 is a non-reference slice. Because slice 5 is not a beginning slice, the video decoder may decode slice 5 and prepare the skip operation with respect to slice 6. In this manner, all slices within the n-th frame 810 may be normally decoded without being skipped.

After completing the skip operation with respect to the n-th frame 810, the video decoder may execute the skip operation with respect to the next frame, that is, an n+1-th frame 820. The video decoder may determine whether slice 1 (the current slice) is a beginning slice, and whether slice 1 is a non-reference slice. Because slice 1 is determined as a beginning slice as well as a non-reference slice, non-reference slices following slice 1 within the n+1-th frame 820 are skipped one by one.

Referring to FIG. 9, the video decoder may now decode an n-th frame 910 from slice 1. The video decoder may receive a skip command while decoding slice 3 within the n-th frame 910. In response to the skip command, the video decoder may complete the decoding of slice 3, and determine whether slice 4 (the current slice) is a beginning slice, and whether slice 4 is a non-reference slice. Because slice 4 is not determined as a beginning slice, the video decoder may decode slice 4 and prepares the skip operation with respect to slice 5 (the next slice). The video decoder may determine whether slice 5 is a beginning slice, and whether slice 5 is a non-reference slice. Because slice 5 is not a beginning slice, the video decoder may decode slice 5 and prepare the skip operation with respect to slice 6. In this manner, all slices within the n-th frame 910 are mostly decoded rather than skipped.

After completing the skip operations with respect to the n-h frame 910, the video decoder may execute the skip operation with respect to the next frame, that is, an n+1-th frame 920. However, because the n+1-th frame 920 is a reference frame, all of the slices within the n+1-th frame 920 are normally decoded.

After completing the skip operation with respect to the n+1-th frame 920, the video decoder may execute the skip operation with respect to the following frame, that is, an n+2-th frame 930. The video decoder may determine whether slice 1 (the current slice) of the n+2-th frame 930 is a beginning slice, and whether slice 1 is a non-reference slice. Because slice 1 is determined as a beginning slice as well as a non-reference slice, non-reference slices followed by slice 1 within the n+2-th frame 930 are skipped one by one.

Figure 10:
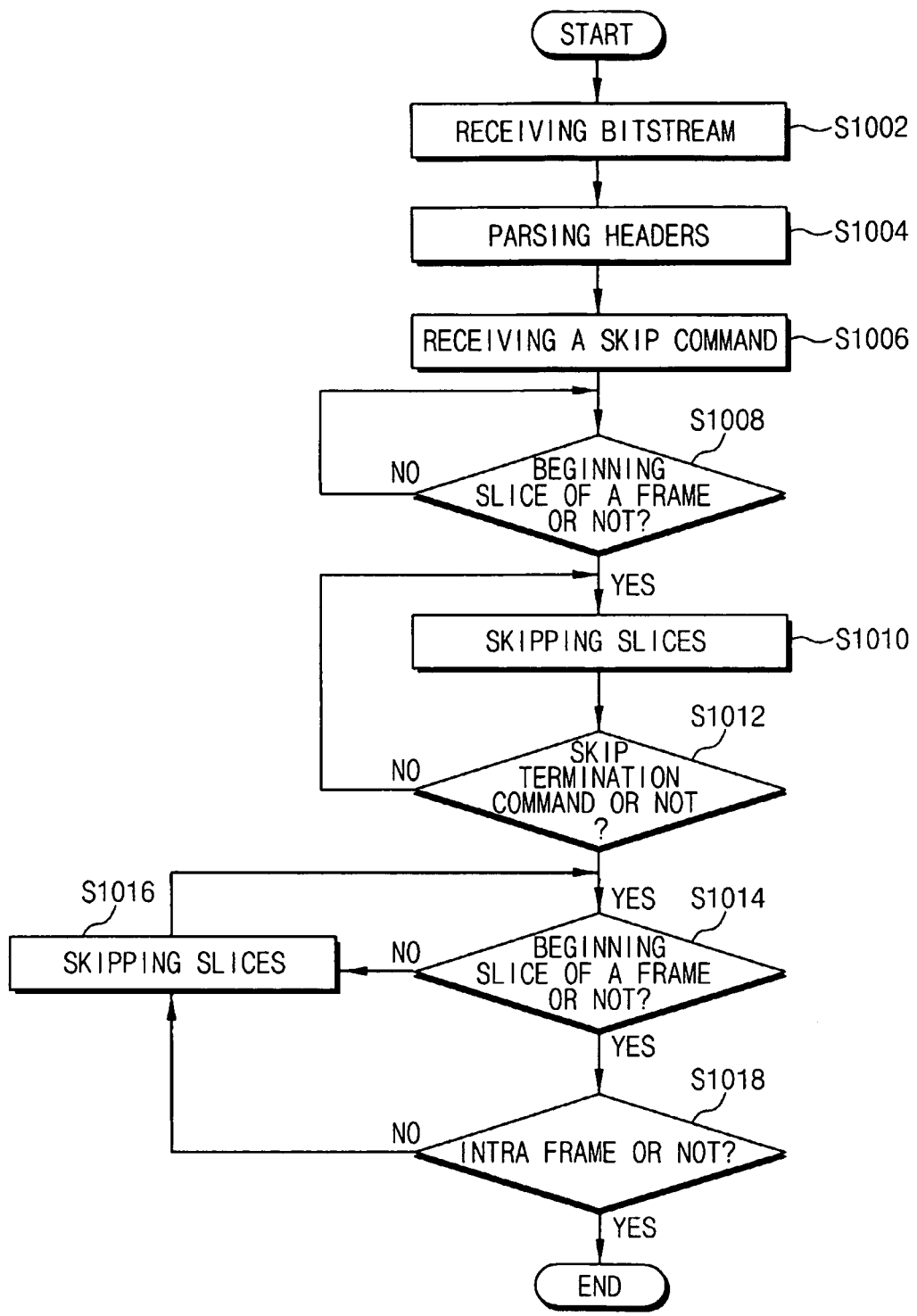
FIG. 10 is a flow chart illustrating a skip function according to another example embodiment.

FIG. 10 is a flow chart illustrating a skip function according to another example embodiment.

In FIG. 7A or FIG. 7B, only the non-reference slices are skipped. The video decoder in FIG. 7A or FIG. 7B skips only the non-reference frames, but not the reference frames. In some examples, the bitstream may have non-reference frames at a very low rate. In other examples, audio signals may be out of synchronization with video signals, otherwise a large number of frames may need to be skipped. For the examples described above, skipping only non-reference frames is impractical and the example skip function in FIG. 10 may be useful for such examples.

A video decoder may receive a bitstream (block S1002). The video decoder may parse a header from the received bitstream (block S1004) and obtain information that is required to decode the bitstream and execute the skip function. After parsing the header, the video decoder may decode a frame encoded in the bitstream.

When a skip command is input (block S1006), the video decoder may execute the skip function.

The video decoder may determine, based on the information from parsing the header, whether the current slice is a beginning slice of the frame (block S1008). If the current slice is not a beginning slice, the video decoder may decode the current slice and continue the determination of whether the next slice is a beginning slice or not.

If the current slice is a beginning slice, the video decoder may skip the current slice and the following slices (block S1010). While skipping the slices, the video decoder may check whether a skip termination command is input (block S1012). The video decoder may continue to skip the slices unless the skip termination command is provided.

In response to the skip termination command, the video decoder may check whether the current slice is a beginning slice of the frame (block S1014). If the current slice is not a beginning slice of the frame, the video decoder may continue to skip (block S1016) until a slice is found as a beginning slice. If the current slice is a beginning slice of the frame, the video decoder may check whether the frame is an intra frame or not (block S1018). When the frame is an intra frame, the video decoder may terminate the skip operation with respect to the current slice. On the other hand, when the frame is not an intra frame, the video decoder may continuously execute the blocks S1014, S1016 and S1018 so as to find a beginning slice of an intra frame. The video decoder may terminate the skip operations when the beginning slice is found.

H.264 standards support encoding and decoding by frames as well as by fields. As for a bitstream containing pictures encoded by fields, it may be desirable for two fields belonging to the same frame to both be skipped or to both be decoded. Otherwise, if one field is skipped but the other field is decoded, an image to be displayed may not be acceptable. A video decoder capable of skipping or decoding both fields that belong to the same frame, even where pictures are encoded by fields will be described in reference with FIG. 11.

Figure 11:
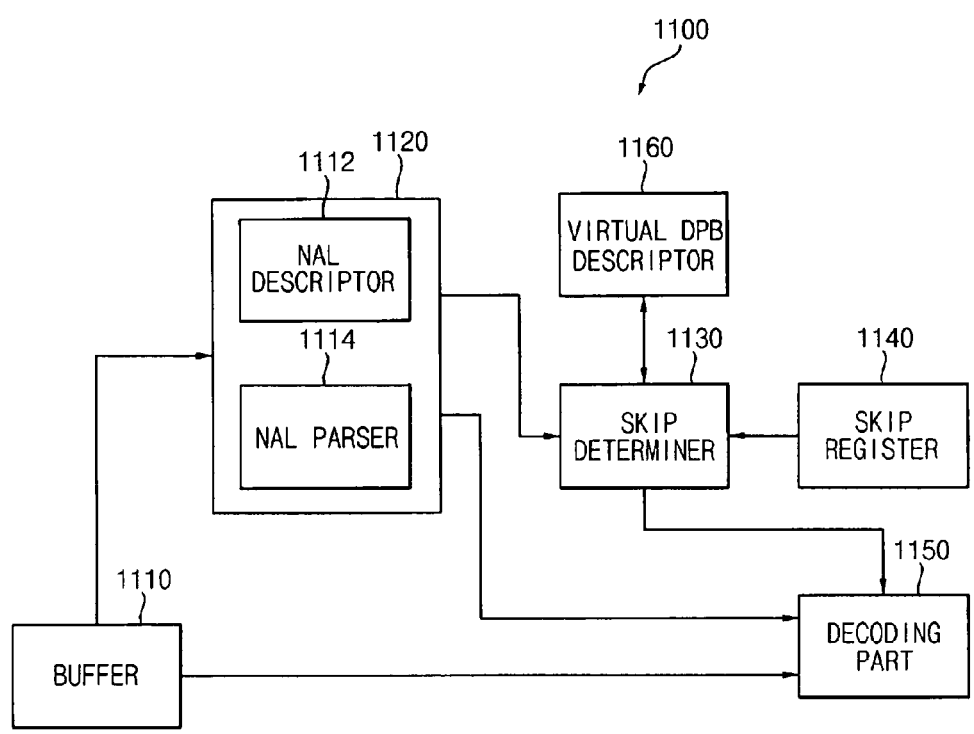
FIG. 11 is a block diagram illustrating a video decoder according to another example embodiment.

FIG. 11 is a block diagram illustrating a video decoder according to another example embodiment.

A video decoder 1100 may include a buffer 1110, a header processing part 1120, a skip determiner 1130, a virtual decoded picture buffer (DPB) descriptor 1160 and/or a decoding part 1150.

The buffer 1110 may store a bitstream flowing into the video decoder 1100. Header information of the bitstream may be provided to the header processing part 1120 and a coded picture of the bitstream may be provided to the decoding part 1150. The coded picture may be a frame as well as a field.

The header processing part 1120 may obtain reference information from the header information in the bitstream that indicates each picture is a non-reference picture or a reference picture. To obtain the reference information, the header processing part 1120 may include an NAL descriptor 1112 and an NAL parser 1114. The NAL descriptor 1112 may interpret an NAL header in each NAL unit of the bitstream. The header processing part 1120 may be capable of determining whether a slice included in the current NAL unit is a reference slice or a non-reference slice by reading a reference information field nal_ref_idc from the NAL header. The NAL parser 1114 may interpret slice header information in an RBSP of the NAL unit. The slice header information may contain information of slice type (slice_type), frame number (frame_num), and/or type of picture (bottom_field_flag) indicating whether the picture is a top field or a bottom field, and the like.

According to H.264 standards, it is not determined which one of the fields flow into a video decoder prior to the other between a top field and a bottom field. For example, a top field T may be first and a bottom field B may follow the top field T, like field pairs, for example, [TB TB TB TB . . . ]. Also a bottom field B may be first and a top field T follows the bottom field B, for example, [BT BT BT BT . . . ]. A mixed order of a top field and a bottom field may also be used, for example, [TB BT BT TB . . . ]. Further, a frame F may be mixed with fields T or B, for example, [F TB TB F . . . ]. A single field T or B, which does not constitute a field pair TB, may also be used, for example, [TB TB TB T . . . ]. Accordingly, the video decoder may not skip the field pairs only based on type of the field. Therefore, upon receiving a top field, the video decoder may determine whether the top field is a first field within the field pair. To achieve this, a video decoder according to example embodiments may include a virtual DPB descriptor 1160.

The virtual DPB descriptor 1160 may store information regarding the status of a virtual DPB buffering recently decoded pictures. The virtual DPB may be a buffer for storing any picture that is skipped, but ordinarily decoded. For example, the virtual DPB descriptor 1160 may store information regarding the status of the virtual DPB that buffers recently decoded or skipped pictures, regardless of whether the picture is skipped or not. The information stored in the virtual DPB descriptor 1160 may include type, frame number and/or reference information of the buffered picture. Using the information stored in the virtual DPB descriptor 1160, the skip determiner 1130 may issue a skip command to the decoding part 1150.

In response to the skip command, the skip determiner 1130 may instruct the decoding part 1150 to skip a non-reference picture, which is probably a first field or a frame. A first field denotes a field that comes first between two fields in a field pair. For example, if a top field from a field pair comes first and a bottom field follows, the top field is referred to as a first field. Otherwise, if a bottom field from a field pair comes first and a top field follows, the bottom field is referred to as a first field. If there is only a single field (which may be either a top field or a bottom field), the single field may be referred to as a first field.

The skip determiner 1130 may instruct the decoding part 1150 to skip non-reference pictures when the non-reference pictures are determined to be a first field or a frame. To achieve this, the skip determiner 1130 may refer to the information stored in the virtual DPB descriptor 1160.

Finding a first field may be executed as follows. The skip determiner 1130 may obtain status information regarding virtually decoded pictures from the virtual DPB descriptor 1160. The skip determiner 1130 may determine the current picture as a first field if the virtually decoded picture has the same type of picture (e.g., a top field or a bottom field) as the current picture, if the virtually decode picture different kinds of reference information from each other, if the virtually decode picture has different frame numbers from each other, or if the virtual DPB contains a field pair. When the current picture is a frame, the skip determiner 1130 does not need to determine whether the current picture is a first field or not.

Pictures, encoded with H.264, may be provided to the video decoder 1100 as the NAL unit stream in slices. When a slice is input, the skip determiner 1130 confirms whether the slice is a non-reference slice and whether the slice is a beginning slice of either a first field or a frame. If the slice is a non-reference slice and a beginning slice of either a first field or a frame, the skip determiner 1130 may instruct the decoding part 1150 to skip the slice.

The skip register 1140 may store status information regarding whether the video decoder 1100 executes or stops the skip operations. The status information may be provided to the skip determiner 1130.

The decoding part 1150 may reconstruct pictures by decoding the encoded pictures from the bitstream. The bitstream in accordance with H.264 standards may be composed of the NAL units containing slices. Therefore, the decoding part 1150 may decode the bitstream in slices to reconstruct the pictures. The decoding part 1150 may execute the skip operations by field pairs or frames based on the skip command from the skip determiner 1130.

Figure 12:
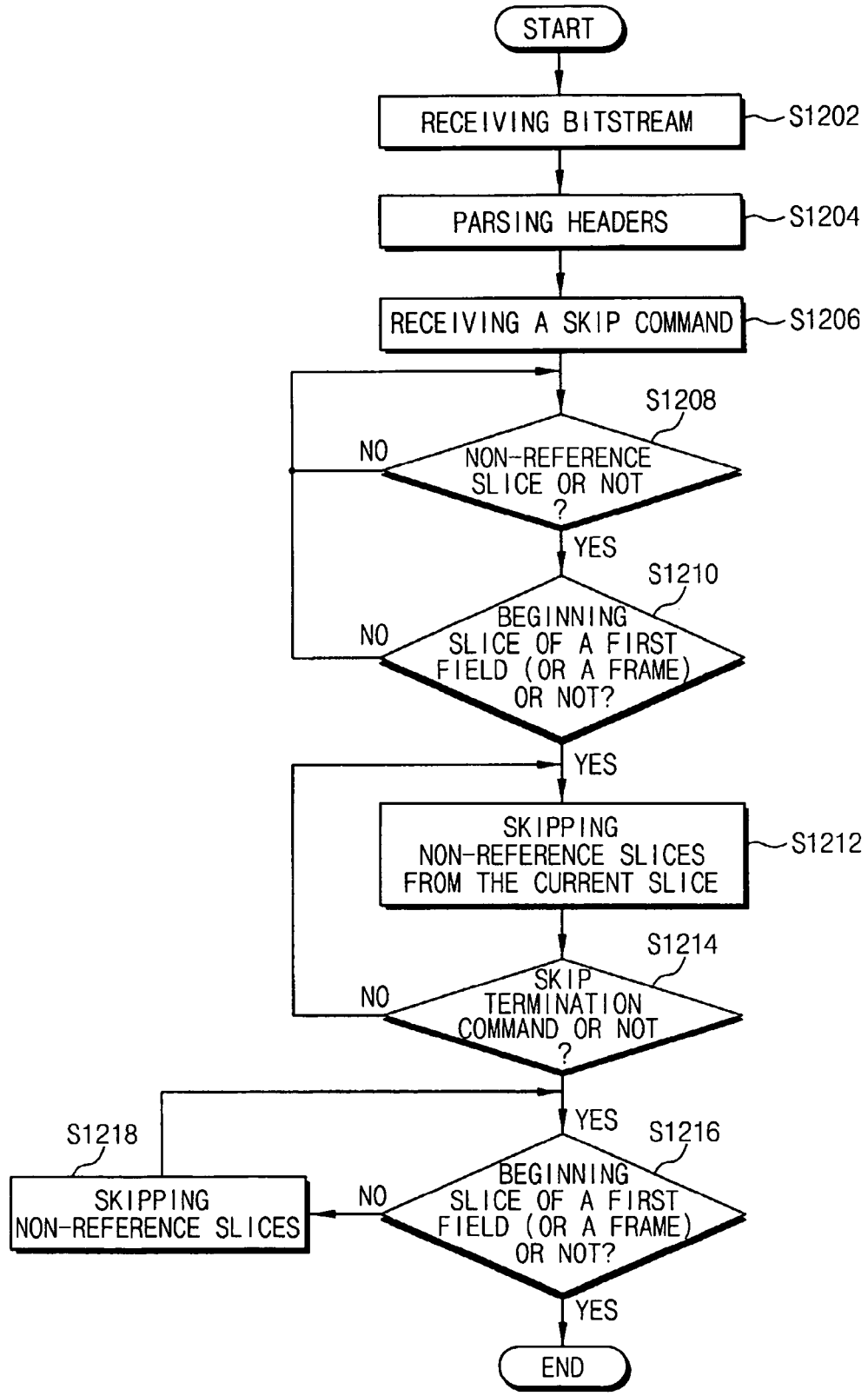
FIG. 12 is a flow chart illustrating another skip process according to another example embodiment.

FIG. 12 is a flow chart illustrating another skip process according to another example embodiment.

A video decoder may receive a bitstream (block S1202). The bitstream in accordance with H.264 standards may be composed of the NAL units containing slices.

The video decoder may parse headers from the received bitstream (block S1204). The video decoder may extract information from an NAL header regarding whether the slice is the reference slice or not, as well as information from a slice header in the NAL unit regarding picture type, slice type, frame number and/or the like. After parsing the headers, the video decoder may decode the encoded pictures.

Upon receipt of a skip command (block S1206), the skip operations may be executed. With respect to fields, a field pair constituting one frame may be skipped simultaneously.

The video decoder may determine whether the current slice is a non-reference slice, based on the information from parsing the headers (block S1208). If the current slice is a reference slice, the video decoder may continue to decode.

If the current slice is a non-reference slice, the video decoder may determine whether the current slice is a beginning slice of a first field or a frame (block S1210). The video decoder may use status information regarding virtually decoded pictures to determine whether the current slice is a beginning slice of a first field or a frame. The video decoder may determine the current picture as a first field if the virtually decoded picture has the same picture type (e.g., a top field or a bottom field) as the current picture, if the virtually decode picture has different kinds of reference information from each other, if the virtually decode picture has different frame numbers from each other, or if the virtual DPB contains a field pair. The video decoder does not need to additionally check a type of the picture and determine whether the picture including slices is a first field or not when a picture including the current slice is a frame.

When the current slice belongs to a non-reference picture, which is either a first field or a frame, the video decoder may determine whether the current slice is a beginning slice of a frame (block S1210). When the current slice is not a beginning slice, the video slice may determine whether the next slice is a non-reference slice or not, and whether the next slice is a beginning slice of a first field or a frame.

If the current slice is a beginning slice, the video decoder may skip non-reference slices from the current slice (block S1212). For example, the video decoder may determine whether the slice is a reference slice or a non-reference slice and skips the slice when the slice is a non-reference slice. Because one picture does not contain non-reference slices and reference slices at the same time, the video decoder may decide whether a picture is referred to or not, based on whether the slice is referred to or not from the NAL header.

During execution of the skip function with respect to the non-reference slices, the video decoder may check whether a skip termination command is input or not (block S1214). If the skip termination command is not input, the video decoder may continue to skip the non-reference slices. If the skip termination command is input, the video decoder may determine whether the current slice is either a beginning slice of a first field or a frame (block S1216). When the current slice is neither a first field nor a beginning slice of a frame, the video decoder may continue to skip the non-reference slices (block S1218). When the current slice is either a beginning slice of a first field or a frame, the video decoder may terminate the skip operations, regardless of whether the current slice is a non-reference slice or a reference slice. That is, whether a first field or a frame is a non-reference picture or a reference picture does not affect the skip operations. The video decoder may either skip or decode all field pairs through the blocks S1216 and S1218.

Figure 13:
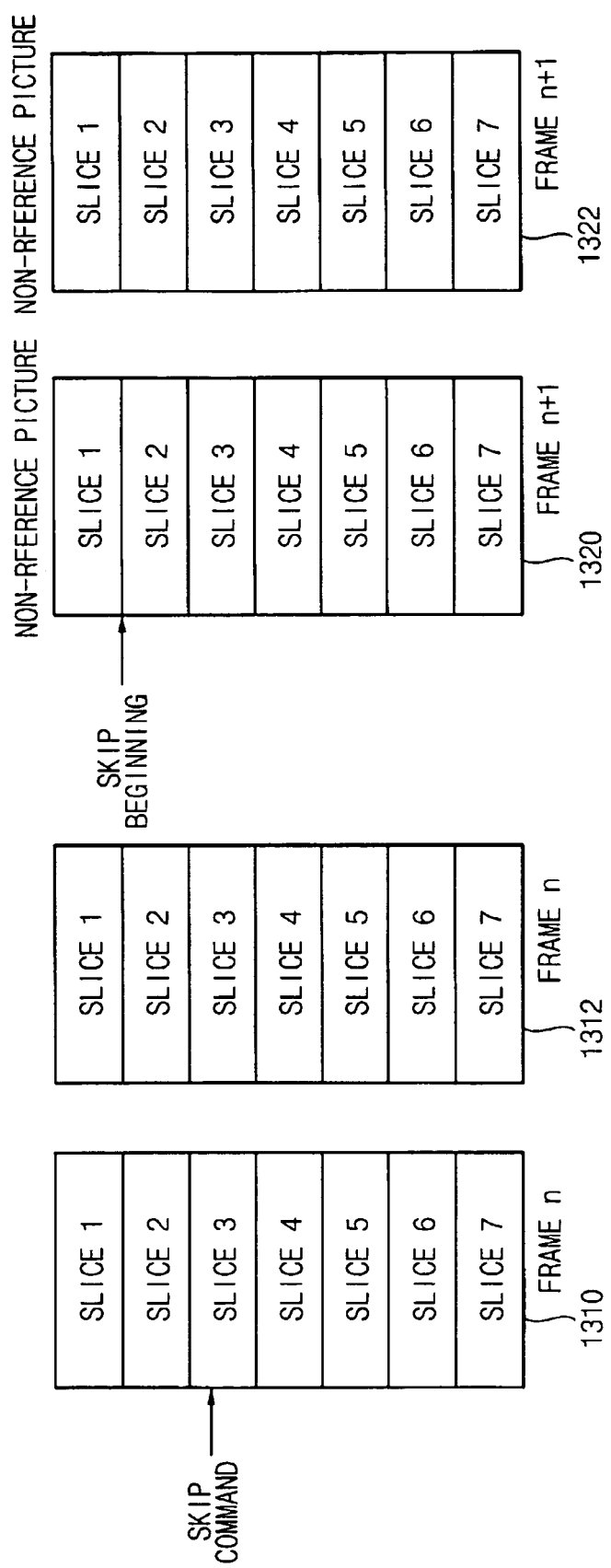
FIGS. 13 and 14 are diagrams illustrating a skip function according to another example embodiment.
Figure 14:
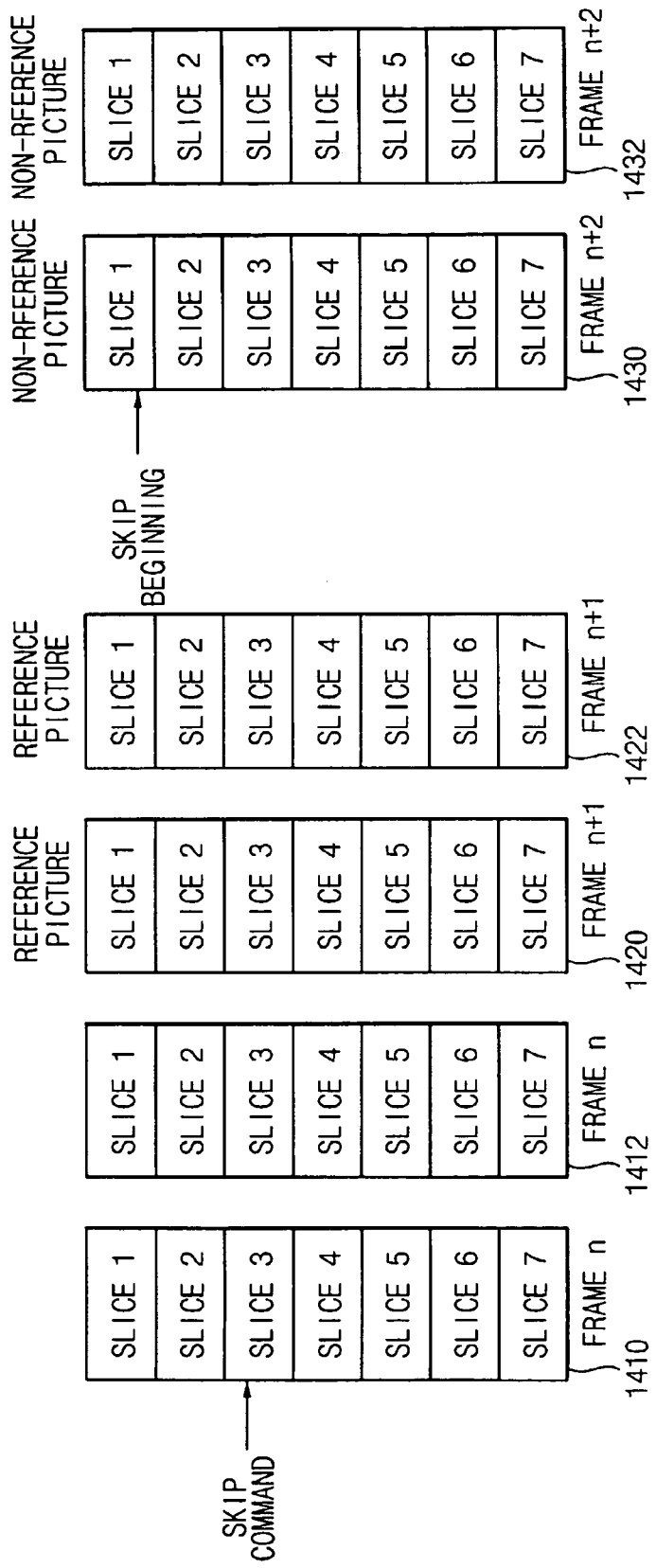

FIGS. 13 and 14 are diagrams illustrating a skip function according to another example embodiment.

Referring to FIG. 13, the video decoder may decode a field 1310 from slice 1. While decoding slice 3 in the field 1310, the video decoder receives a skip command. In response to the skip command, the video decoder may complete the decoding of slice 3 and determine whether slice 4 (the current slice) is a beginning slice of a first field or a frame, and whether slice 4 is a non-reference slice or not. In this example, because slice 4 is not a beginning slice, the video decoder decodes slice 4 and prepares the skip operations with respect to slice 5 (the next slice). After this process, all slices in the field 1310 are not skipped and just ordinarily decoded.

Next, the video decoder executes the skip operation with respect to the next field 1312, which together with the field 1310 constitutes an n-th frame. The video decoder determines a slice 1 is whether a beginning slice of a first field or a frame, and whether slice 1 is a non-reference slice or not. Because slice 1 is a beginning slice of a second field rather than a first field, the video decoder decodes slice 1 normally. In this manner, the field 1312 is decoded normally.

Continuously, the video decoder executes the skip operation with respect to a slice 1 of a field 1320. The video decoder determines whether slice 1 is a beginning slice of either a first field or a frame, and whether slice 1 is a non-reference slice or not. Because the field 1320 is both a non-reference picture and a first field, and slice 1 is a beginning slice, the video decoder starts to skip the slices from slice 1 of the field 1320.

Even when a skip termination command is applied during skipping the field 1320, the video decoder continues to skip both fields 1320 and 1322 because the fields 1320 and 1322 constitute a field pair of an n+1-th frame.

Referring to FIG. 14, the video decoder now decodes a field 1410 from slice 1. While decoding slice 3 in the field 1410, the video decoder receives a skip command. In response to the skip command, the video decoder first completes the decoding of slice 3, and then determines a slice 4 (the current slice) is whether a beginning slice of a first field or a frame, and whether slice 4 is a non-reference slice or not. In this example, because slice 4 is not a beginning slice, the video decoder may decode slice 4 and prepare the skip operations with respect to slice 5 (the next slice). After this process, all slices in the field 1410 are not skipped and just ordinarily decoded.

The video decoder may execute the skip operation with respect to the next field 1412, which together with the field 1410 constitutes an n-th frame. The video decoder determines whether a slice 1 is a beginning slice of a first field or a frame, and whether slice 1 is a non-reference slice or not. Because slice 1 is a beginning slice of a second field rather than a first field, the video decoder may decode slice 1 normally. In this manner, the field 1412 is normally decoded.

Continuously, the video decoder executes the skip operation with respect to a slice 1 of a field 1420. The video decoder determines slice 1 is whether a beginning slice of a first field or a frame, and whether slice 1 is a non-reference slice or not. Because the field 1420 is a reference slice, the video decoder decodes slice 1 normally. In this manner, the field 1420 may be decoded normally.

The video decoder may execute the skip operation with respect to the next field 1422, which together with the field 1420 may constitute an n+1-th frame. The video decoder may determine whether slice 1 is either a beginning slice of a first field or a frame and whether slice 1 is a non-reference slice or not. Because slice 1 is a beginning slice of a second field, rather than a first field and is a reference slice, the video decoder may decode slice 1 normally. In this manner, the field 1422 may be decoded normally.

The video decoder may execute the skip operation with respect to a slice 1 of a field 1430. The video decoder may determine whether slice 1 is a beginning slice of a first field or a frame and whether slice 1 is a non-reference slice or not. Because the field 1430 is both a non-reference picture and a first field, and slice 1 is a beginning slice, the video decoder may start to skip the slices from slice 1 of the field 1430. Even if a skip termination command is applied during skipping the field 1430, the video decoder continues to skip both fields 1430 and 1432 because the fields 1430 and 1432 constitute a field pair of an n+2-th frame.

Figure 15:
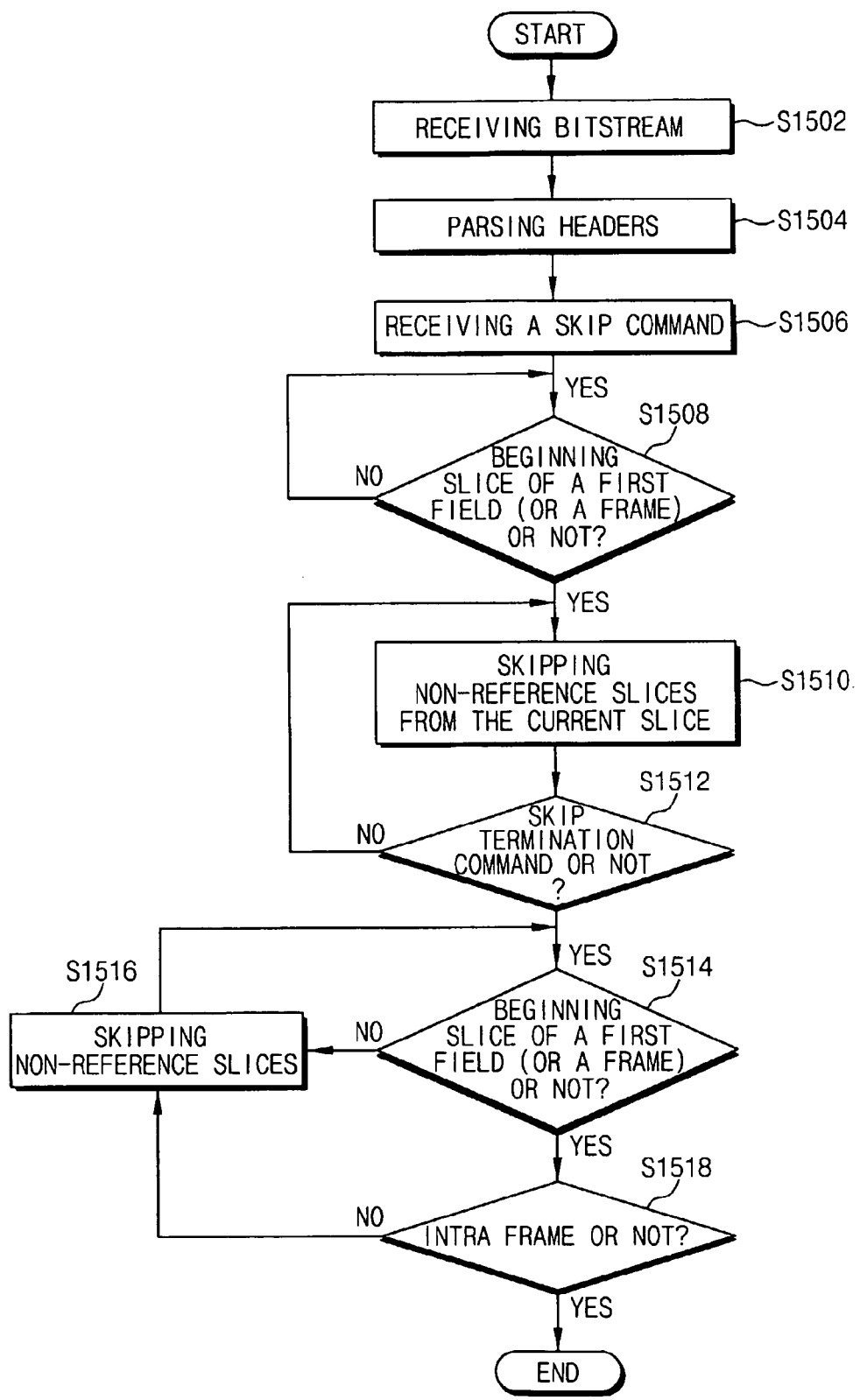
FIG. 15 is a flow chart illustrating a skip function according to another example embodiment.

FIG. 15 is a flow chart illustrating a skip function according to another example embodiment.

According to FIG. 15, the video decoder may execute a skip function only with respect to non-reference slices. For example, the video decoder may skip only non-reference pictures (field pairs or frames) but not reference pictures. In some examples, the bitstream may have non-reference pictures at a very low rate. In other examples, audio signals may not be synchronized with video signals, or a large number of pictures may need to be skipped. In these examples, skipping only non-reference pictures is impractical and the skip function in FIG. 15 will be useful for such examples.

A video decoder receives a bitstream (block S1502). The video decoder may parse a header from the received bitstream (block S1504) and obtain information to decode the bitstream and execute the skip function. After parsing the header, the video decoder may decode a frame encoded in the bitstream.

When a skip command is input (block S1506), the video decoder may execute the skip function. The video decoder may determine based on the information, whether the current slice is a beginning slice of a first field or a frame and whether the current slice is a non-reference slice (block S1508). If the current slice is neither a first field nor a beginning slice of a frame, the video decoder may decode the current slice and continue a determination of whether the next slice is a beginning slice of a first field or a frame and whether the next slice is a non-reference slice or not.

If the current slice is a beginning slice of either a first field or a frame, the video decoder may skip the current slice and the following slices (block S1510). While skipping the slices, the video decoder may check whether a skip termination command is input (block S1512). The video decoder may continue to skip the slices unless the skip termination command is provided.

In response to the skip termination command, the video decoder may check whether the current slice is a beginning slice of a first field or a frame (block S1514). If the current slice is a beginning slice of neither a first field nor a frame, the video decoder may continue to skip (block S1516) until a slice is determined to be a beginning slice. If the current slice is a beginning slice of either a first field or a frame, the video decoder may check whether the picture is an intra picture or not (block S1518). When the picture is an intra picture, the video decoder may terminate the skip operations with respect to the current slice. When the picture is not an intra picture, the video decoder may continue to execute the blocks S1514, S1516 and S1518 so as to find a beginning slice of an intra picture. The video decoder may terminate the skip operations when it finds a beginning slice.

Example embodiments may support a fast skip mode. For example, the example embodiments in FIGS. 7A, 7B and 12 may skip only non-reference pictures, but other example embodiments in FIGS. 10 and 15 may skip pictures successively. Video decoders supporting various skip modes will be described referring to FIGS. 16 through 20. For convenience, skip modes are described as being divided into a normal picture skip mode for skipping non-reference pictures and a fast picture skip mode for skipping pictures successively. These are illustrative of example embodiments, so there may be more skip modes and each of the skip modes may be varied.

Figure 16:
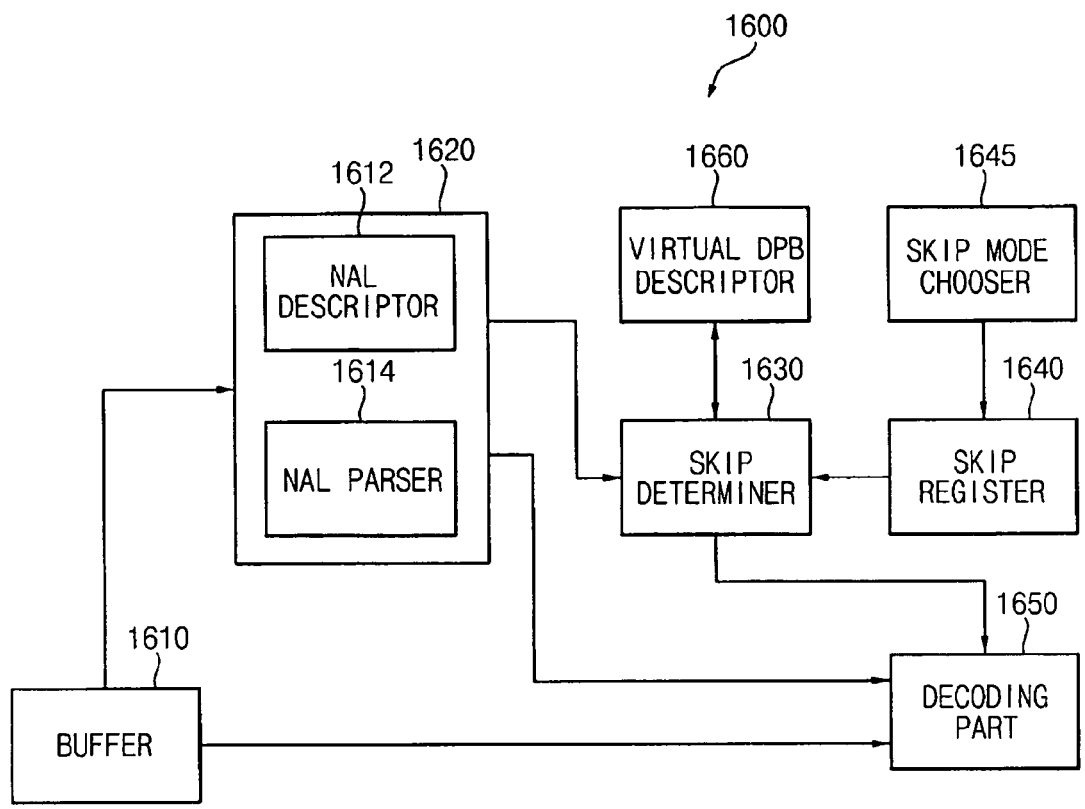
FIG. 16 is a block diagram illustrating a video decoder according to another example embodiment.

FIG. 16 is a block diagram illustrating a video decoder according to another example embodiment. The video decoder 1600 may include a buffer 1610, a header processing part 1620, a skip mode selector 1645, a skip determiner 1630, a virtual DPB descriptor 1660 and/or a decoding part 1650.

The buffer 1610 may store a bitstream flowing into the video decoder 1600. Header information of the bitstream may be provided to the header processing part 1620 and a coded frame of the bitstream may be provided to the decoding part 1650. The picture may be a frame as well as a field.

The header processing part 1620 may obtain reference information from the header information in the bitstream that indicates each picture is a non-reference picture or a reference picture. To obtain the reference information, the header processing part 1620 may include an NAL descriptor 1612 and an NAL parser 1614. The NAL descriptor 1612 may interpret an NAL header in each NAL unit of the bitstream. The header processing part 1620 may be capable of determining whether a slice included in the current NAL unit is a reference slice or a non-reference slice by reading a reference information field nal_ref_idc from the NAL header. The NAL parser 1614 may interpret slice header information in an RBSP of the NAL unit. The slice header information may contain information regarding type of picture (bottom_field_flag), slice type (slice_type), frame number (frame_num) and/or the like.

The virtual DPB descriptor 1660 may store information regarding status of a virtual DPB that buffers the latest virtually decoded pictures.

The virtual DPB is a buffer for storing any picture that is skipped, but ordinarily decoded. For example, the virtual DPB descriptor 1660 may store information regarding status of the virtual DPB that buffers recently decoded or skipped pictures, regardless of whether the picture is skipped or not. The information stored in the virtual DPB descriptor 1660 may include type, frame number and/or reference information of the buffered picture. Using the information stored in the virtual DPB descriptor 1660, the skip determiner 1630 may issue a skip command to the decoding part 1650.

The skip mode selector 1645 may choose among the skip modes. The skip modes may include a normal picture skip mode and a fast picture skip mode. In the normal picture skip mode, the video decoder may skip non-reference pictures. In the fast picture skip mode, the video decoder may skip pictures successively.

The skip register 1640 may store the skip mode selected by the skip mode selector 1645. For example, the skip register 1640 may store status information regarding whether the video decoder 1600 operates in the normal picture skip mode or the fast picture skip mode, and whether the video decoder 1600 executes or stops the skip operations. The status information may be provided to the skip determiner 1630.

In response to the skip command, the skip determiner 1630 may instruct the decoding part 1650 to skip pictures.

In the normal picture skip mode, the skip determiner 1630 may instruct the decoding part 1650 to skip non-reference pictures that are determined as a first field or a frame. The skip determiner 1630 may instruct the decoding part 1650 to skip the non-reference pictures from the beginning of the picture, if the non-reference picture is determined as a first field or a frame. To achieve this, the skip determiner 1630 may refer to the information stored in the virtual DPB descriptor 1660.

Finding a first field may be achieved by performing the following. The skip determiner 1630 may obtain status information regarding virtually decoded pictures from the virtual DPB descriptor 1660. The skip determiner 1630 may determine the current picture as a first field, if the virtually decoded picture has the same type of picture (e.g., a top field or a bottom field) as the current picture, if the virtually decode picture has different kinds of reference information from each other, if the virtually decode picture has different frame numbers from each other, or if the virtual DPB contains a field pair. When the current picture is a frame, the skip determiner 1630 does not need to determine whether the current picture is a first field or not.

Pictures encoded with H.264 standards are provided to the video decoder 1600 as the NAL unit stream in slices. When a slice is input, the skip determiner 1630 may confirm whether the slice is a non-reference slice, and whether the slice is a beginning slice of a first field or a frame. If the slice is a non-reference slice and a beginning slice of either a first field or a frame, the skip determiner 1630 may instruct the decoding part 1650 to skip the slice.

In the fast picture skip mode, the skip determiner 1630 may instruct the video decoder to skip the pictures successively. For example, the skip determiner 1630 may instruct the video decoder to skip pictures successively from the beginning of the pictures when the pictures are determined to be either a first field or a frame.

The decoding part 1650 may reconstruct pictures by decoding the encoded pictures from the bitstream. The bitstream in accordance with H.264 standards may be composed of the NAL units containing slices. Therefore, the decoding part 1650 may decode the bitstream in slices to reconstruct the pictures. The decoding part 1650 may execute the skip operations by field pairs or frames in response to the skip command.

Figure 17:
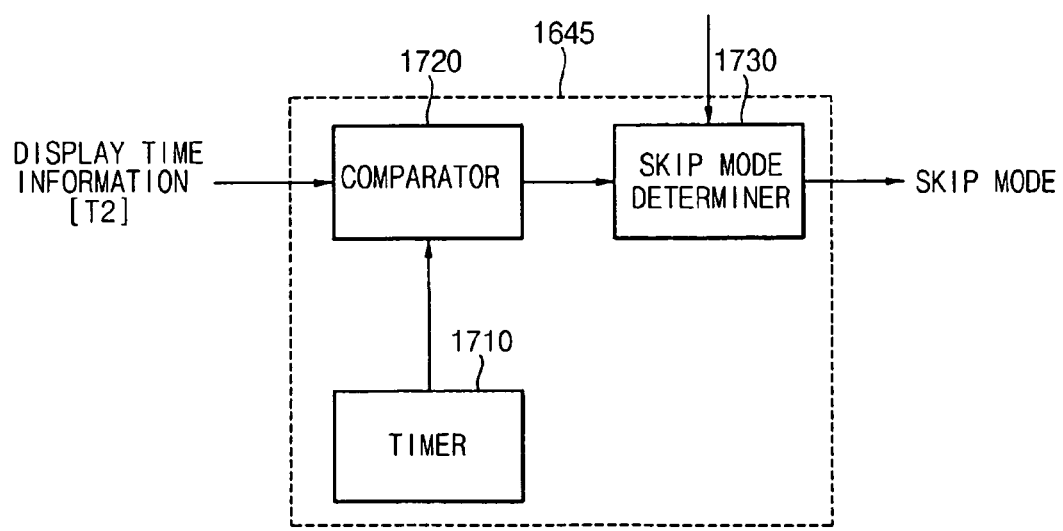
FIG. 17 is a block diagram illustrating a skip mode selection unit of the video decoder according to an example embodiment.

FIG. 17 is a block diagram illustrating a skip mode selection unit of a video decoder according to an example embodiment.

The skip mode selector 1645 may include a timer 1710, a comparator 1720 and/or a skip determiner 1730.

The timer 1710 may generate internal time information T1 that indicates value of time clock of the video decoder. The comparator 1720 may compare the internal time information T1 with display time information T2 that provides information regarding time for decoded picture to be displayed. A comparison result from the comparator 1720 may be provided to the skip determiner 1730.

The skip determiner 1730 may determine a skip mode based on the comparison result between time information. If a value of the display time information T2 is greater than that of the internal time information T1, the decoded picture may not be yet displayed. For example, if the display time information T2 corresponds to 01:00:01 and the internal time information T1 corresponds to 01:00:00, the decoded picture will be displayed one second later than a time to decode.

On the other hand, if a value of the display time information T2 is smaller than that of the internal time information T1, the decoded picture loses its time to be displayed. In other words, video information may be behind audio information. Therefore, the comparator 1720 may instruct the video decoder to skip pictures due to video lagging. Depending on how much the video is behind the audio, the skip determiner 1730 may select one skip mode between the normal picture skip mode and the fast picture skip mode. Additionally, the skip determiner 1730 may select a skip mode upon receipt of a fast playback command from a user. For example, the skip determiner 1730 may select the normal picture skip mode because some pictures may need to be displayed during picture skipping according to the fast playback command. The selected skip mode may be provided to the skip register 1640.

Figure 18:
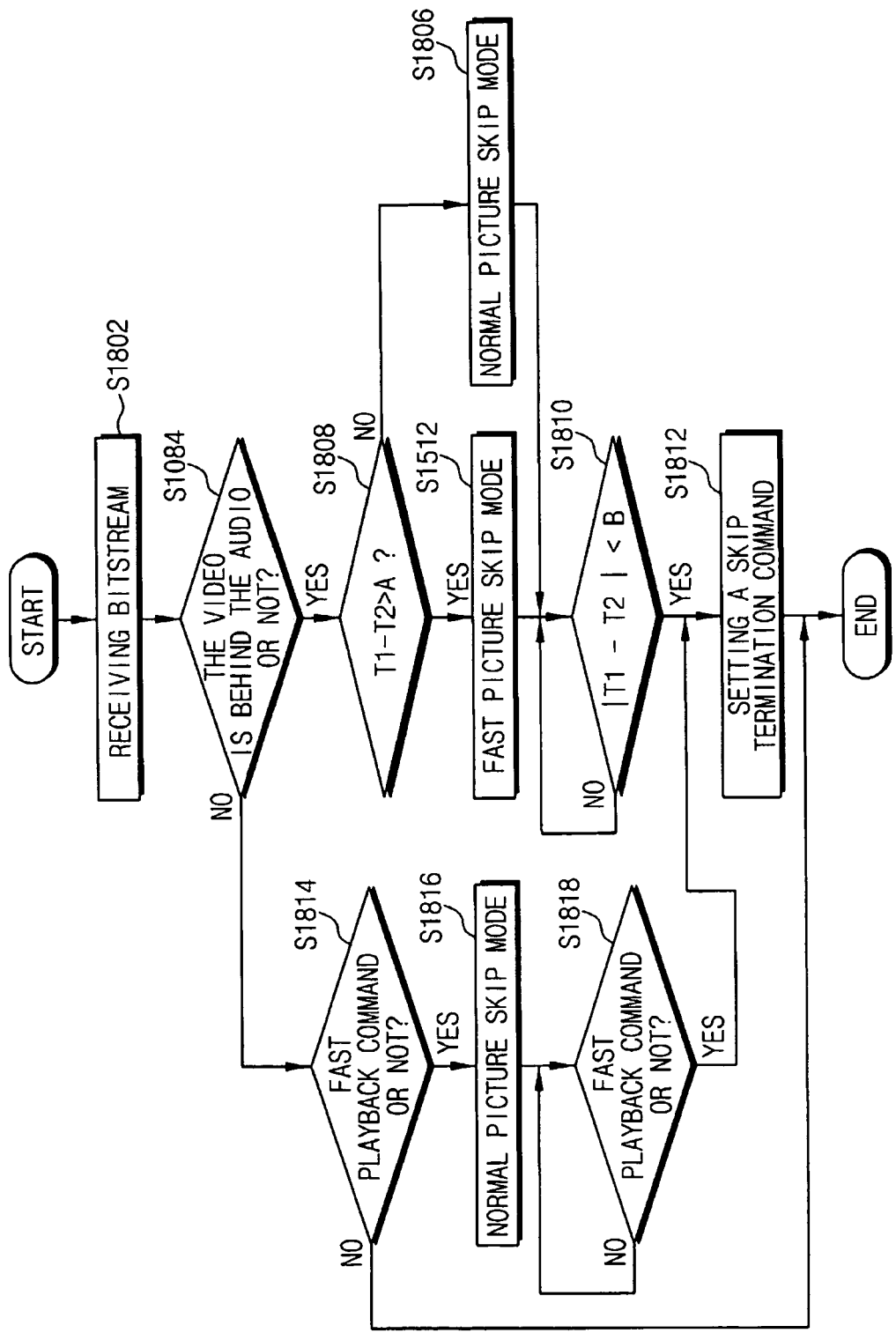
FIG. 18 is a flow chart illustrating detailed operations for a skip function classified by skip modes according to an example embodiment.

FIG. 18 is a flow chart illustrating a skip function classified by skip modes according to an example embodiment.

The video decoder may determine whether the video is behind the audio or not (block S1802). If the video is not behind the audio, the video decoder decodes pictures normally.

While the video decoder decodes pictures, the skip mode selector may check whether a fast playback command is provided or not (block S1814). Without the fast playback command, the video decoder decodes pictures as usual without skipping.

With the fast playback command, the skip mode selector may set a value in the skip register as the normal picture skip mode (block S1816). The video decoder may skip pictures that are non-reference pictures, and may decode pictures that are reference pictures.

The skip mode selector may check whether the fast playback command is terminated or not (block S1818). If the fast playback command is not terminated, the value of the skip register may be maintained. If the fast playback command is terminated, the skip mode selector may set the value of the skip register as a skip termination (block S1812).

When the video is behind the audio, the skip mode selector may compare display time information T2 with internal time information T1, and may check whether the internal time information T1 is greater than the display time information T2 (block S1808). If the difference between time information is greater than the first reference value A, the skip mode selector may set the value of the skip register as the fast picture skip mode (block S1808). On the other hand, if the difference between two time informations is smaller than the first reference value A, the skip mode selector may set the value of the skip register as the normal picture skip mode (block S1806).

The video decoder executing the skip operations with respect to the pictures according to the value of the skip register may set either the normal picture skip mode or the fast picture skip mode. The skip mode selector may check during skipping pictures whether the difference between the time information decreases below a second reference value B (block S1810). The second reference value B may be relatively smaller than the first reference value A and may be used to determine whether the difference between the time information is equal to or substantially equal to each other.

The skip mode selector may set the value of the skip register as the skip termination when difference between the time information decreases below the second reference value B (block S1812).

Detailed operations according to the normal picture skip mode and the fast picture skip mode will be described hereinafter referring to FIGS. 19 and 20, respectively.

Figure 19:
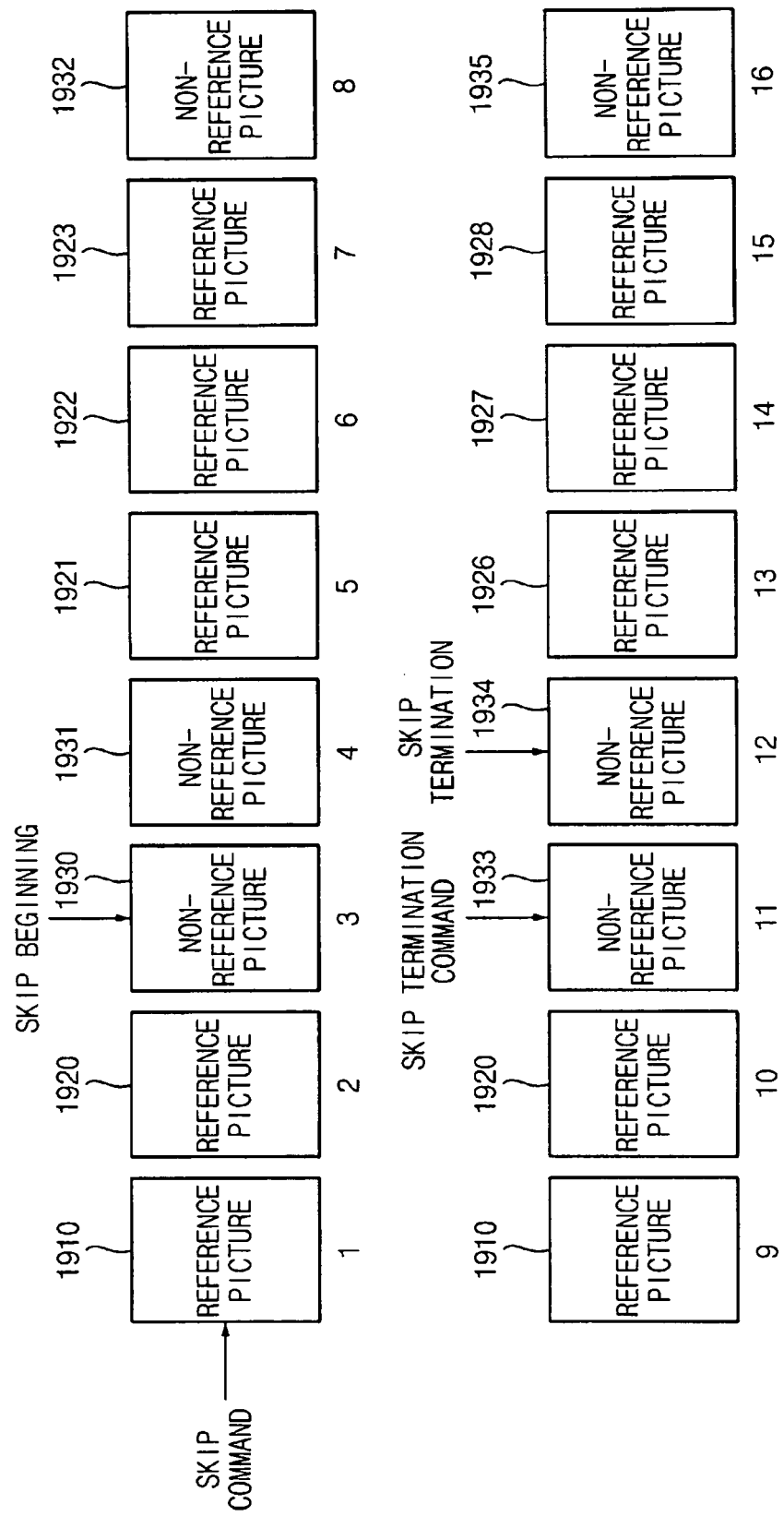
FIG. 19 is a diagram illustrating operations for a normal picture skip mode.

FIG. 19 is a diagram illustrating operation for a normal picture skip mode, if a bitstream contains sixteen successively coded pictures and all of the pictures correspond to frames for convenience of description.

When receiving a skip command during decoding a picture 1910, the video decoder may finish decoding the currently decoded picture 1910 and determine whether the next picture 1920 is a reference picture or not. As shown, the picture 1920 is a reference picture, so the video decoder decodes the picture 1920 without skipping.

The video decoder may determine whether the picture 1930 is a reference picture or not. The picture may be determined to be a non-reference picture and the video decoder skips the following non-reference pictures 1931, 1932 and 1933. Pictures that remain not skipped are decoded.

Receiving a skip termination command during skipping the non-reference picture 1933, the video decoder may terminate skipping pictures at the beginning of the next picture 1934. However, when the non-reference pictures 1933 and 1934 constitute a field pair, the video decoder will skip the non-reference picture 1934 and begin to decode the reference picture 1926 normally.

Figure 20:
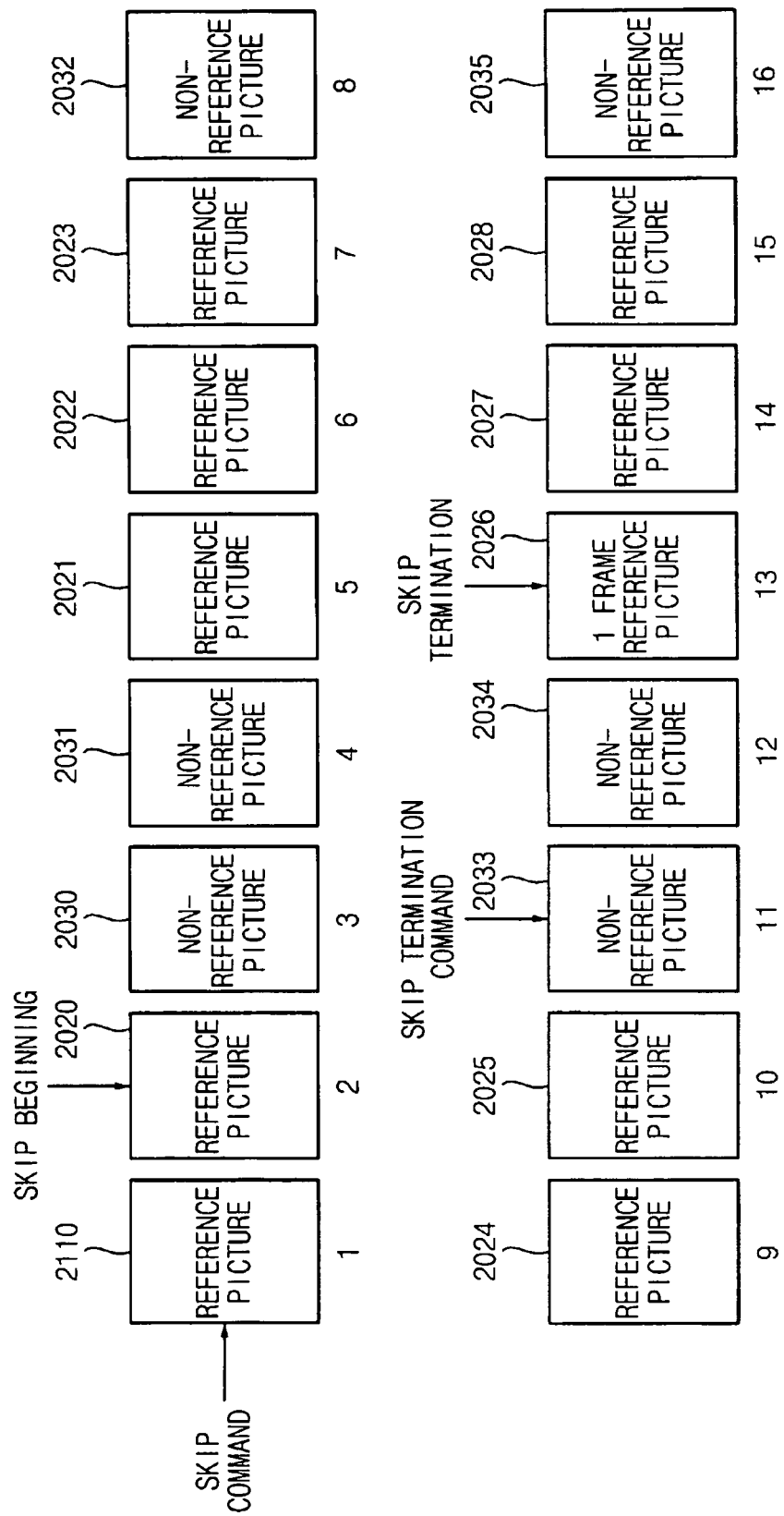
FIG. 20 is a diagram illustrating operations for a fast picture skip mode.

FIG. 20 is a diagram illustrating operations for a fast picture skip mode, if a bitstream contains sixteen successively coded pictures and all of the pictures correspond to frames for convenience of description.

When receiving a skip command during decoding a picture 2110, the video decoder may finish decoding the currently decoded picture 2010, and skip the following picture 2020, 2030, 2031, 2021, 2022, 2023, 2032, 2024, 2025 and 2033 successively rather than determine whether the next picture 2020 is a reference picture or not. As shown, the picture 1920 (in FIG. 19) is a reference picture and the video decoder decodes the picture 1920 without skipping. Receiving a skip termination command during skipping the picture 2033, the video decoder may continue to skip pictures until an I frame begins. The picture 2024 may also be skipped. The video decoder may terminate skipping pictures at the beginning of a picture 2026 that is an I frame and decode pictures 2026, 2027, 2028 and 2035 normally.

Figure 21:
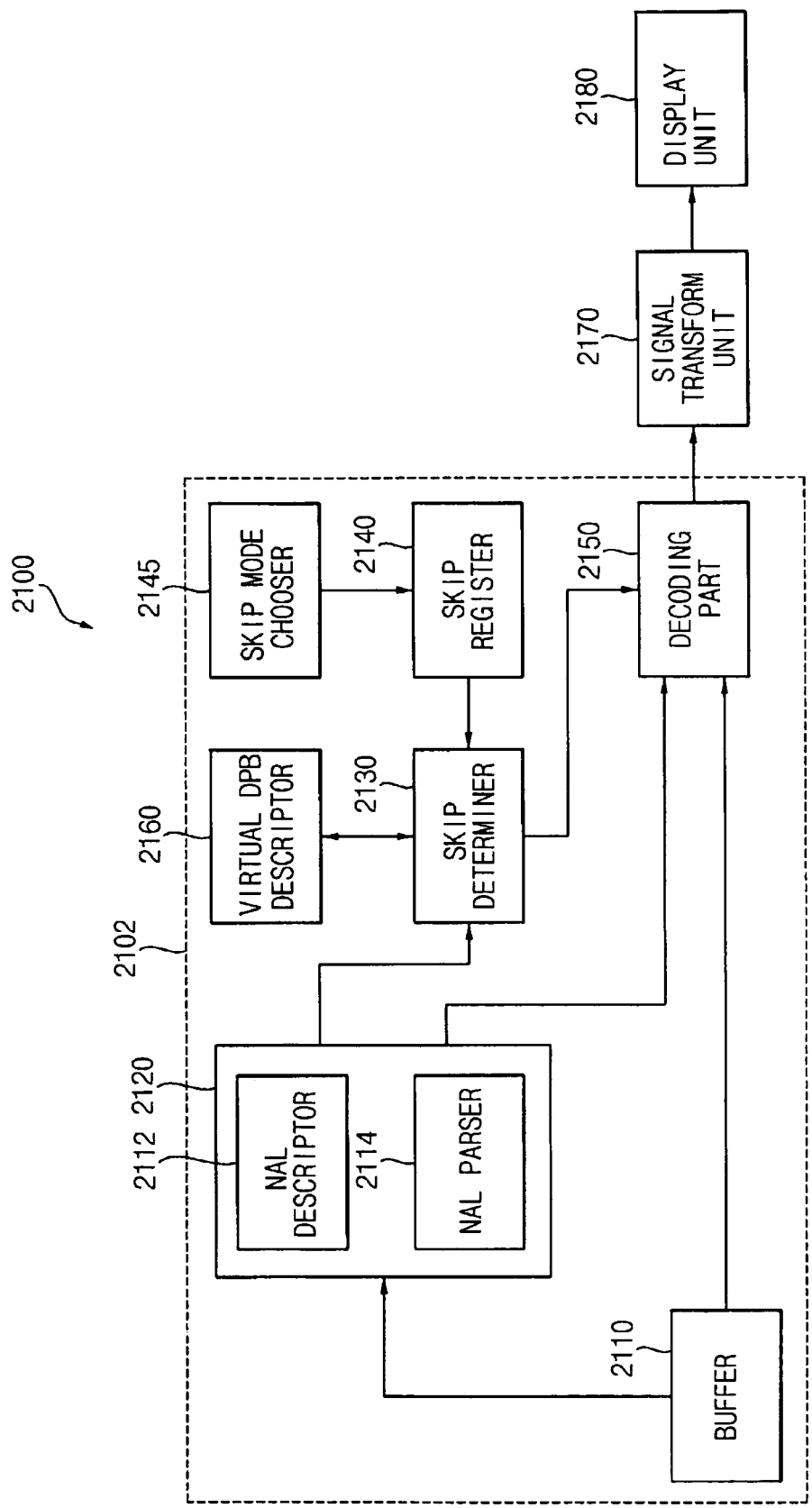
FIG. 21 is a block diagram illustrating a configuration of a video player according to an example embodiment.

FIG. 21 is a block diagram illustrating a configuration of a video player according to an example embodiment.

A video player 2100 may include a video decoder 2102, a signal transform unit 2170 and/or a display unit 2180.

The video decoder 2102 may include a buffer 2110, a header processing part 2120, a skip mode selector 2145, a skip determiner 2130, a virtual DPB descriptor 2160 and/or a decoding part 2150.

The buffer 2110 may store a bitstream flowing into the video decoder 2102.

The header processing part 2120 may obtain information to decode or skip encoded pictures from the header information in the bitstream.

The virtual DPB descriptor 2160 may store information regarding status of a virtual DPB that buffers recently decoded pictures. The virtual DPB descriptor 2160 may provide the skip determiner 2130 with the status information regarding virtually decoded pictures.

The skip mode selector 2145 may choose one among the skip modes. The skip modes may include a normal picture skip mode and a fast picture skip mode. In the normal picture skip mode, the video decoder may skip non-reference pictures. In the fast picture skip mode, the video decoder may skip pictures successively.

The skip register 2140 may store the skip mode selected by the skip mode selector 2145. For example, the skip register 2140 may store status information regarding whether the video decoder 2100 operates in the normal picture skip mode or the fast picture skip mode, and whether the video decoder 2100 executes or stops the skip operations. The status information in the skip register 2140 may be provided to the skip determiner 2130.

In response to the skip command, the skip determiner 2130 may instruct the decoding part 2150 to skip pictures.

The decoding part 2150 may reconstruct pictures by decoding encoded pictures from the bitstream. The decoding part 2150 may execute the skip operations by field pairs or frames based on the skip command that comes from the skip determiner 2130.

The transform unit 2170 may transform signals of pictures decoded by the video decoder 2102 into display signals. In an example embodiment, the reconstructed pictures from the video decoder 2102 may contain YCrCb signals. The transform unit 2170 may transform the YCrCb signals into RGB signals and transform the RGB signals into display signals that are suitable to be displayed on the display unit 2180. For example, the signals transform unit 2170 may transform the RGB signals into NTSC signals or PAL signals that are provided to the display unit 2180.

The display unit 2180 may display the reconstructed pictures based on the display signals.

In example embodiments, the video decoder may skip pictures based on the skip command. However, this is illustrative only, and the video decoder may decode all of the pictures normally and skip some among the decoded pictures.

Figure 22:
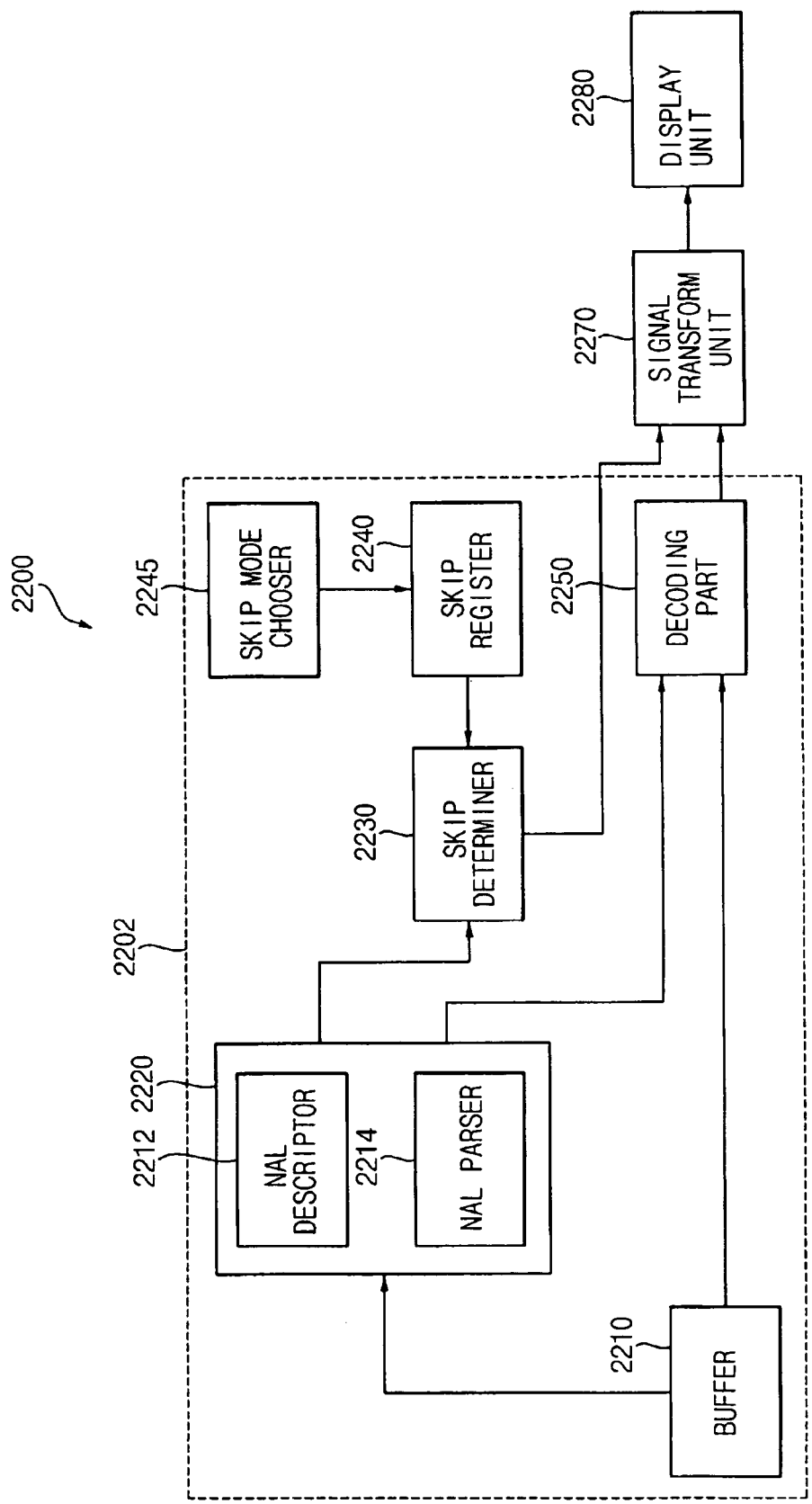
FIG. 22 is a block diagram illustrating a configuration of another video player according to an example embodiment.

FIG. 22 is a block diagram illustrating a configuration of another video player according to another example embodiment.

A video player 2200 may include a video decoder 2202, a signal transform unit 2270 and/or a display unit 2280. The video decoder 2202 may include a buffer 2210, a header processing part 2220, a skip mode selector 2245, a skip determiner 2230 and/or a decoding part 2250.

Respective operations of the buffer 2210, the header processing part 2220 and the skip mode selector 2245 may be substantially similar to those of corresponding elements of the video player 2200 in FIG. 21.

However, the skip determiner 2230 need not instruct the decoding part 2250 to skip a picture, and the decoding part 2250 to reconstruct all of the pictures. The skip determiner 2230 may instruct the signal transform unit 2270 to skip selected pictures rather than the decoding part 2250. The skip determiner 2230 may instruct the skip operation without distinction between a reference picture and a non-reference picture with respect to already decoded pictures.

The transform unit 2270 may transform signals of pictures decoded by the video decoder 2202 into display signals. The transform unit 2270 may skip some pictures among the decoded pictures based on a skip command from the skip determiner 2230. In other words, the signal transform unit 2170 may transform the remaining pictures, except the skipped pictures, into display signals that may be provided to the display unit 2280. The display unit 2280 may display the reconstructed pictures based on the display signals.

Figure 23:
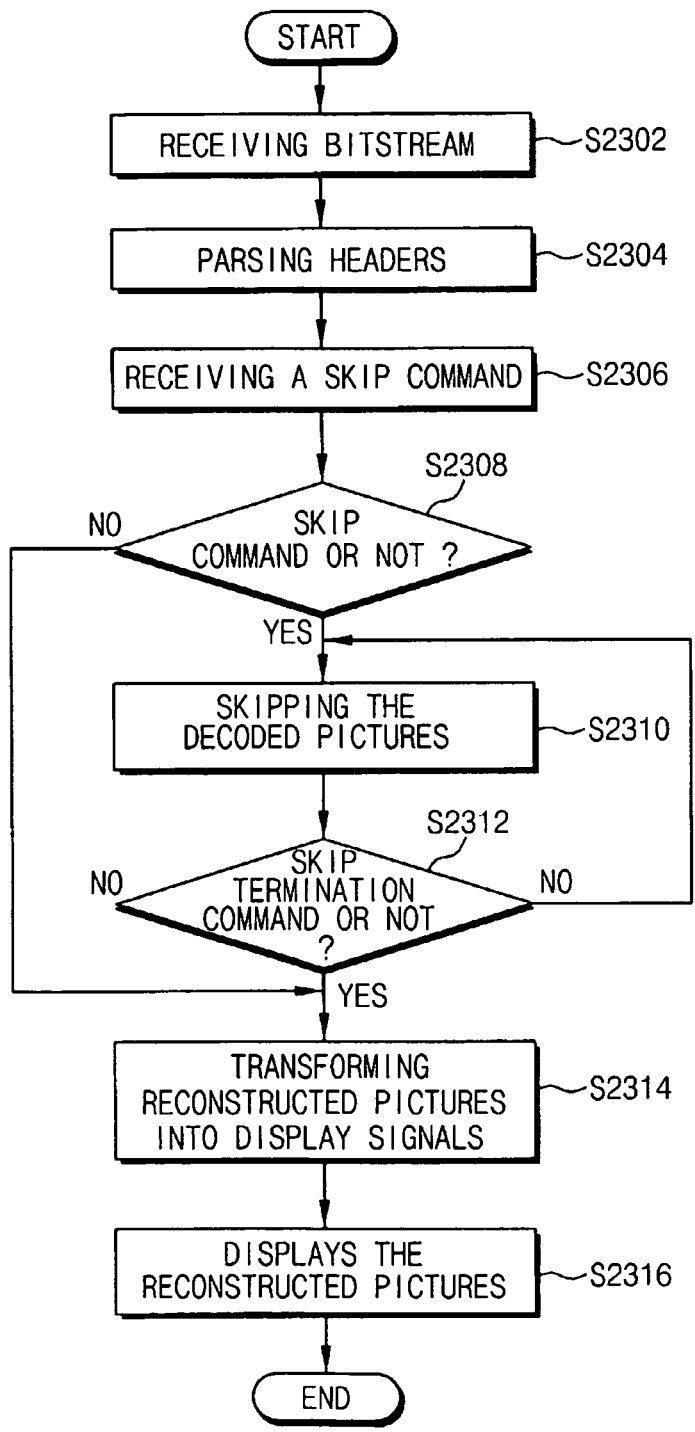
FIG. 23 is a flow chart illustrating example operation of the video player in FIG. 22.

FIG. 23 is a flow chart illustrating example operation of the video player in FIG. 22. The video player may receive a bitstream (block S2302). The video player may parse a header from the received bitstream in guide to decode encoded pictures (block S2304).

After parsing the header, the video player may decode pictures encoded in the bitstream, based on the information obtained by parsing the header (block S2306). The video player may check whether a skip command is received or not (block S2308) and transform reconstructed pictures into display signals (block S2314) without a skipping command. The video displayer may display the reconstructed video pictures (block S2316).

After receiving a skip command, the video player may skip the decoded pictures (block S2310). For example, the video player need not transform the decoded pictures into the display signals. While skipping the decoded pictures, the video player may check whether a skip termination command is received or not (block S2312). The video player may continue to skip the decoded picture without a skipping termination code.

In response to the skip termination command, the video player may transform the decoded pictures into the display signals (block S2314) and display the reconstructed pictures (block S2316).

According to example embodiments, a video decoder may execute a picture skipping function with respect to a bitstream, for example, an H.264 bit stream of which pictures may not be skipped based on only picture types.

Therefore, a video player including a video decoder having a picture skip function may exploit the picture skip function to synchronize video and audio, when the video and the audio are not synchronized, or to achieve fast playback.

The foregoing is illustrative of example embodiments and is not to be construed as limiting thereof. Although example embodiments have been described, those skilled in the art will readily appreciate that many modifications are possible to the example embodiments without materially departing from the novel teachings and advantages of example embodiments described. Accordingly, all such modifications are intended to be included within the scope of the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the example embodiments disclosed, and that modifications to the disclosed example embodiments, as well as other embodiments, are intended to be included within the scope of the appended claims. The scope is defined by the following claims, with equivalents of the claims to be included therein.

What is claimed is:

1. A video decoder comprising:
a decoding part for decoding H.264 encoded entities within a bitstream to reconstruct original entities;
a header processing part for obtaining reference information from header information within the bitstream, the reference information indicating whether each of the H.264 encoded entities corresponds to a non-reference entity or a reference entity, the indication being independent of whether the H.264 encoded entities are an I, P, or B picture-type and the indication being a part of a header in the bitstream;
a virtually decoded entity buffer descriptor for storing identification information about a virtual decoded entity buffer, the virtual decoded entity buffer being configured to buffer at least one previously processed virtually decoded entity, the virtually decoded buffer descriptor being configured to store the identification information regardless of whether the at least one previously processed virtually decoded entity is a reference entity; and
a skip determiner for, when receiving a skip command, determining whether or not a current one of the H.264 encoded entity corresponds to a first field based on the stored identification information, and for instructing the decoding part to skip non-reference entities from a non-reference entity that follows immediately after a currently decoded entity,
wherein the skip determiner determines a current one of the encoded entities as a first field if the virtually decoded entity has the same type of picture as the current encoded entity, if the virtually decoded entity has different kinds of reference information than the current encoded entity, if the virtually decoded entity has different frame numbers than the current encoded entity, or if the virtually decoded picture buffer contains a field pair based on the identification information stored in the virtually decoded picture buffer descriptor, and
wherein the skip determiner determines whether a slice to be decoded is a beginning slice or not and whether the slice is also included in a non-reference entity or not, and when the slice to be decoded is determined as a beginning slice and included in the non-reference entity, the skip determiner instructs the decoding part to skip the encoded entity including the slice to be decoded.

2. The video decoder of claim 1, wherein the encoded entities are frames.

3. The video decoder of claim 2, wherein the bitstream is formatted as a network abstraction layer (NAL) unit strewn format.

4. The video decoder of claim 3, wherein the header processing part obtains the reference information from a header within each NAL unit of the NAL unit stream.

5. A video player comprising:
the video decoder of claim 2;
a signal transforming part for transforming the reconstructed original frames into display signals; and
a displaying part for video images according to the display signals.

6. The video player of claim 5, wherein the bitstream is formatted as a network abstraction layer (NAL) unit stream format.

7. The video player of claim 6, wherein the header processing part obtains the reference information from a header within each NAL unit of the NAL unit stream.

8. The video decoder of claim 1, wherein the encoded entities are pictures.

9. The video decoder of claim 8, wherein the identification information includes a picture type, a frame number, and the reference information of a virtually decoded picture prior to the currently decoded picture.

10. The video decoder of claim 8, the identification information comprises the identification information with respect to two virtually decoded pictures.

11. The video decoder of claim 8, wherein the bitstream is formatted as a network abstraction layer (NAL) unit stream format.

12. The video decoder of claim 11, wherein the header processing part obtains the reference information from a header within each NAL unit of the NAL unit stream and obtains the identification information from a header of a slice within each NAL unit.

13. The video decoder of claim 8, wherein the skip determiner, responding to a skip termination command determines whether the last skipped picture is a first field or not; then if the last skipped picture is not a first field, instructs the decoding part to terminate skipping, and if the last skipped picture is a first field, determines whether the currently decoded picture is a second field or not; if the currently decoded picture is a second field, instructs the decoding part to terminate skipping after finishing skipping the currently decoded picture.

14. A video player comprising;
the video decoder of claim 8;
a signal transforming part for transforming the reconstructed original pictures to display signal; and
a display for outputting video images according to the display signal.

15. The video player of claim 14, wherein the identification information includes a picture type of a virtually decoded picture prior to the currently decoded picture, a frame number and the reference information.

16. The video player of claim 15, the identification information comprises the identification informations with respect to two virtually decoded pictures.

17. The video player of claim 14, wherein the bitstream is formatted as a network abstraction layer (NAL) unit stream format.

18. The video player of claim 17, wherein the header processing part obtains the reference information from a header within each NAL unit of the NAL unit stream and obtains the identification information from a header of a slice within each NAL unit.

19. The video player of claim 14, wherein the skip determiner, responding to a skip termination command, operates as follows: determining whether the last skipped picture is a first field or not, if the last skipped picture is not a first field, ordering the decoding part to terminate skipping, if the last skipped picture is a first field, determining whether the currently decoded picture is a second field or not, and if the currently decoded picture is a second field, ordering the decoding part to terminate skipping after finishing skipping the currently decoded picture.

20. The video decoder of claim 8, further comprising:
a skip mode selector for selecting a picture skip mode between a normal picture skip mode for skipping non-reference pictures and a fast picture skip mode for skipping pictures sequentially; wherein
the skip determiner, in the normal picture skip mode, instructs the decoding part to skip non-reference pictures from a non-reference picture that is either a first field or a frame and follows immediately after a currently decoded picture, and in the fast picture skip mode, instructs the decoding part to skip pictures from a picture next to the currently decoded picture.

21. The video decoder of claim 20, wherein the skip mode selector comprises:
a timer for generating an internal time information;
a comparator for comparing display time information with the internal time information; and
a skip determiner for determining a picture skip mode according to a result of comparison between the display time information with the internal time information.

22. The video decoder of claim 21, wherein the skip determiner determines the picture skip mode as the normal picture skip mode if the difference between the internal time information and the display time information is smaller than a given reference value, and determines the picture skip mode as the fast picture skip mode if the difference between the internal time information and the display time information is greater than the reference value.

23. The video decoder of claim 21, wherein the skip determiner determines the picture skip mode as the normal picture skip mode if a fast playback command is received.

24. A video player comprising:
the video decoder of claim 20;
a signal transforming part for transforming the reconstructed original pictures to display signal; and
a display for outputting video images according to the display signal.

25. The video player claim 24, wherein the skip mode selector comprises:
a timer for generating an internal time information;
a comparator for comparing display time information with the internal time information; and
a skip determiner for determining a picture skip mode according to a result of comparison between the display time information and the internal time information.

26. The video player of claim 25, wherein the skip determiner determines the picture skip mode as the normal picture skip mode if a difference between the internal time information and the display time information is smaller than a given reference value, and determines the picture skip mode as the fast picture skip mode if the difference between the internal time information and the display time information is greater than the reference value.

27. The video player of claim 25, wherein the skip determiner determines the picture skip mode as the normal picture skip mode if a fast playback command is received.

28. The video decoder of claim 8, further comprising:
a skip mode selector for selecting a picture skip mode between a normal picture skip mode for skipping non-reference pictures and a fast picture skip mode for skipping pictures sequentially; wherein
the skip determiner, in the normal picture slip mode, instructs the decoding part to skip non-reference pictures from a non-reference picture that is either a first field or a frame and follows immediately after a currently decoded picture, and in the fast picture skip mode, instructs the decoding part to skip pictures from a picture next to the currently decoded picture.

29. The video decoder of claim 28, wherein the skip mode selector comprises:
timer for generating internal time information;
a comparator for comparing display time information with the internal time information; and
a skip determiner for determining a picture skip mode according to a result of comparison between the display time information and the internal time information.

30. The video decoder of claim 29, wherein the skip determiner determines the picture skip mode as the normal picture skip mode if the difference between the internal time information and the display time information is smaller than a given reference value, and determines the picture skip mode as the fast picture skip mode if the difference between the internal time information and the display time information is greater than the reference value.

31. The video decoder of claim 29, wherein the skip determiner determines the picture skip mode as the normal picture skip mode if a fast playback command is received.

32. A video player comprising:
the video decoder of claim 28;
a signal transforming part for transforming the reconstructed original pictures to display signal; and
a display for outputting video images according to the display signal.

33. The video player claim 32, wherein the skip mode selector comprises;
a timer for generating internal time information;
a comparator for comparing display time information with the internal time information; and
a skip determiner for determining a picture skip mode according to a result of comparison between the display time information and the internal time information.

34. The video player of claim 33, wherein the skip determiner determines the picture skip mode as the normal picture skip mode if a difference between the internal time information and the display time information is smaller than a given reference value, and determines the picture skip mode as the fast picture skip mode if the difference between the internal time information and the display time information is greater than the reference value.

35. The video player of claim 33, wherein the skip determiner determines the picture skip mode as the normal picture skip mode if a fast playback command is received.

36. A method of video decoding H.264 encoded entities in a bitstream to reconstruct original entities, the method comprising:
obtaining reference information from header information within the bitstream, the reference information indicating whether each of the H.264 encoded entities corresponds to a non-reference entity or a reference entity, the indication being independent of whether the H.264 encoded entities are an I, P, or B picture-type and the indication being a part of a header in the bitstream;
storing identification information about a virtual decoded entity buffer, the virtual decoded entity buffer being configured to buffer at least one previously processed virtually decoded entity, wherein the storing stores the identification information regardless of whether the at least one previously processed virtually decoded entity is a reference entity;
determining whether or not a current one of the H.264 encoded entities corresponds to a first field based on the stored identification information;
receiving a skip command; and
skipping non-reference entities from a non-reference entity that follows immediately after a currently decoded entity,
wherein the determining determines a current one of the encoded entities as a first field if the virtually decoded entity has the same type of picture as the current encoded entity, if the virtually decoded entity has different kinds of reference information than the current encoded entity, if the virtually decoded entity has different frame numbers than the current encoded entity, or if the virtually decoded picture buffer contains a field pair based on the identification information stored in the virtually decoded picture buffer descriptor, and
wherein the skipping includes,
determining whether a slice to be decoded is a beginning slice or not,
determining whether the slice is included in a non-reference entity or not, and
when the slice to be decoded is determined as a beginning slice and included in the non-reference entity, the skipping skips non-reference entities from the non-reference entity including the slice to be decoded.

37. The method of claim 36, wherein the encoded entities are frames.

38. The method of claim 37, wherein the bitstream is formatted as a network abstraction layer (NAL) unit stream format.

39. The method of claim 38, wherein the header processing part obtains the reference information from a header within each NAL unit of the NAL unit stream.

40. The method of claim 37, further comprising:
decoding the frames in the bitstream to reconstruct the original frames;
transforming the reconstructed original frames into a display signal; and
outputting video images corresponding to the display signal.

41. The method of claim 40, wherein the bitstream is formatted as a network abstraction layer (NAL) unit stream format.

42. The method of claim 41, wherein the header processing part obtains the reference information from a header within each NAL unit of the NAL unit stream.

43. The method of claim 36, wherein the encoded entities are pictures, each including a frame or a field.

44. The method of claim 43, wherein the bitstream is formatted as a network abstraction layer (NAL) unit stream format.

45. The method of claim 44, wherein the header processing part obtains the reference information from a header within each NAL unit of the NAL unit stream.

46. The method of claim 36, further comprising: receiving a skip termination command; determining whether the last skipped picture is a first field after the skip termination command is received; when the last skipped picture is not determined as a first field, terminating skipping; when the last skipped picture is determined as a first field, further determining whether the currently decoded picture is a first field or not; and when the currently decoded picture is determined as a first field, terminating skipping after skipping the currently decoded picture.

47. The method of claim 43, further comprising:
decoding the frames in the bitstream to reconstruct the original frames;
transforming the reconstructed original frames into a display signal; and
outputting video images corresponding to the display signal.

48. The method of claim 47, wherein the bitstream is formatted as a network abstraction layer (NAL) unit stream format.

49. The method of claim 48, wherein the header processing part obtains the reference information from a header within each NAL unit of the NAL unit stream.

50. The method of claim 47, further comprising: receiving a skip termination command; determining whether the last skipped picture is a first field after the skip termination command is received; when the last skipped picture is not determined as a first field, terminating skipping; when the last skipped picture is determined as a first field, further determining whether the currently decoded picture is a first field or not; and when the currently decoded picture is determined as a first field, terminating skipping after skipping the currently decoded picture.

51. The method of claim 43, further comprising:
selecting a picture skip mode between a normal picture skip mode for skipping non-reference pictures and a fast picture skip mode for skipping pictures successively; and
when the normal picture skip mode is selected, skipping non-reference pictures from a non-reference picture that is either a first field or a frame and follows immediately after a currently decoded picture; and
when the fast picture skip mode is selected, skipping pictures from a picture next to the currently decoded picture.

52. The method of claim 51, wherein selecting a picture skip mode comprises:
generating an internal time information;
comparing display time information with the internal time information; and
determining one of the picture skip modes according to a result of comparison between the display time information and the internal time information.

53. The method of claim 52, wherein selecting a picture skip mode comprises determining the picture skip mode as the normal picture skip mode if a difference between the internal time information and the display time information is smaller than a given reference value, and determining the picture skip mode as the fast picture skip mode if the difference between the internal time information and the display time information is greater than the reference value.

54. The method of claim 51, wherein selecting a picture skip mode comprises determining the picture skip mode as the normal picture skip mode if a fast playback command is received.

55. The method of claim 54, further comprising:
decoding the frames in the bitstream to reconstruct the original frames;
transforming the reconstructed original frames into a display signal; and
outputting video images corresponding to the display signal.

56. The method of claim 55, wherein selecting a picture skip mode comprises:
generating an internal time information;
comparing display time information with the internal time information; and
determining one of the picture skip modes according to a result of comparison between the display time information and the internal time information.

57. The method of claim 56, wherein selecting a picture skip mode comprises determining the picture skip mode as the normal picture skip mode if the difference between the internal time information and the display time information is smaller than a given reference value, and determining the picture skip mode as the fast picture skip mode if the difference between the internal time information and the display time information is greater than the reference value.

58. The method of claim 55, wherein selecting a picture skip mode comprises determining the picture skip mode as the normal picture skip mode if a fast playback command is received.

* * * * *